(12) United States Patent
Kotnis

(10) Patent No.: US 10,018,089 B2
(45) Date of Patent: Jul. 10, 2018

(54) METHOD AND APPARATUS FOR DECREASING FUEL COMSUMPTION DURING PARTICULATE FILTER GENERATION

(75) Inventor: Ashish Kotnis, Troy, MI (US)

(73) Assignee: Dow Global Technologies LLC, Midland, MI (US)

( * ) Notice: Subject to any disclaimer, the term of this patent is extended or adjusted under 35 U.S.C. 154(b) by 954 days.

(21) Appl. No.: 13/819,083

(22) PCT Filed: Sep. 1, 2011

(86) PCT No.: PCT/US2011/050190
§ 371 (c)(1),
(2), (4) Date: Feb. 26, 2013

(87) PCT Pub. No.: WO2012/033704
PCT Pub. Date: Mar. 15, 2012

(65) Prior Publication Data
US 2013/0152551 A1   Jun. 20, 2013

Related U.S. Application Data

(60) Provisional application No. 61/381,290, filed on Sep. 9, 2010.

(51) Int. Cl.
*F01N 3/00* (2006.01)
*F01N 3/02* (2006.01)
(Continued)

(52) U.S. Cl.
CPC ............ *F01N 3/023* (2013.01); *F01N 3/021* (2013.01); *F02D 41/029* (2013.01);
(Continued)

(58) Field of Classification Search
USPC .................. 60/274, 277, 286, 295, 297, 311
See application file for complete search history.

(56) References Cited

U.S. PATENT DOCUMENTS 7,275,365 B2    10/2007   Zhan et al.
2005/0126162 A1   6/2005   Otake et al.
(Continued)

FOREIGN PATENT DOCUMENTS

EP    1541828 A1   6/2005
EP    1840358 A2   10/2007
(Continued)

OTHER PUBLICATIONS

Bertrand, Figueras, et al., "Diesel engine, fitted with exhaust . . . ", Nov. 9, 2001, French Abstract for French Pat. No. 2808559.
(Continued)

*Primary Examiner* — Patrick Maines
*Assistant Examiner* — Dapinder Singh

(57) ABSTRACT

A diesel particulate filter system comprising: a temperature sensor on the inlet side of the diesel particulate filter; a temperature sensor on the outlet side of the diesel particulate filter; a pressure sensor on the inlet side of the diesel particulate filter; and a control module in communication with the temperature sensors and the pressure sensor, and the control module is loaded with a look-up table that correlates the amount of soot loaded in the diesel particulate filter to a change in pressure measured by the pressure sensor; wherein the control module Initiates a regeneration cycle when soot loading of the diesel particulate filter achieves a predetermined soot load.

11 Claims, 11 Drawing Sheets

(51) Int. Cl.
*F01N 3/10* (2006.01)
*F01N 3/20* (2006.01)
*F01N 3/023* (2006.01)
*F02D 41/02* (2006.01)
*F01N 3/021* (2006.01)
*F02D 41/14* (2006.01)
*F01N 3/035* (2006.01)

(52) U.S. Cl.
CPC .......... *F02D 41/1446* (2013.01); *F01N 3/035* (2013.01); *F01N 3/106* (2013.01); *F01N 3/2066* (2013.01); *F02D 2200/0812* (2013.01); *Y02A 50/2325* (2018.01)

(56) References Cited

U.S. PATENT DOCUMENTS

| | | | |
|---|---|---|---|
| 2007/0068147 A1* | 3/2007 | Sun et al. | 60/297 |
| 2007/0193258 A1 | 8/2007 | Berke | |
| 2007/0220868 A1 | 9/2007 | Nishizawa et al. | |
| 2008/0016856 A1 | 1/2008 | Zhang et al. | |
| 2008/0127636 A1 | 6/2008 | Dahlgren | |
| 2008/0148700 A1* | 6/2008 | Ziebarth | 55/523 |
| 2008/0314032 A1* | 12/2008 | Li et al. | 60/297 |
| 2009/0182479 A1 | 7/2009 | Daneau et al. | |
| 2009/0241512 A1 | 10/2009 | Wirth | |
| 2009/0241513 A1 | 10/2009 | Collins et al. | |
| 2009/0293453 A1* | 12/2009 | Sujan | 60/285 |
| 2010/0269490 A1 | 10/2010 | Kanaya et al. | |
| 2010/0307339 A1* | 12/2010 | Tadrous | B01D 46/0063 95/280 |

FOREIGN PATENT DOCUMENTS

| | | |
|---|---|---|
| EP | 2213853 A1 | 8/2010 |
| WO | WO2009025657 A1 | 2/2009 |

OTHER PUBLICATIONS

International Preliminary Report on Patentability, PCT/US2011/050190, dated Sep. 1, 2011, Dow Global Technologies LLC.
International Search Report and Written Opinion, PCT/US2011/050190, dated Sep. 1, 2011, Dow Global Technologies LLC.

* cited by examiner

METHOD AND APPARATUS FOR DECREASING FUEL COMSUMPTION DURING PARTICULATE FILTER GENERATION

CLAIM OF PRIORITY

This application is a national phase filing under 35 USC § 371 from PCT Application serial number PCT/US2011/050190, filed on Sep. 1, 2011, and claims priority therefrom, which is incorporated by reference herein. This application further claims priority to U.S. Provisional Application Ser. No. 61/381,290 filed Sep. 9, 2010, the contents of which are incorporated by reference herein.

FIELD OF THE INVENTION

The present invention generally relates to a system that includes a particulate filter to control emissions, and more specifically a process for optimizing a regeneration cycle of a particulate filter, calculating the optimum size of a particulate filter, and controlling the particulate filter temperature when the engine speed is reduced to an idle.

BACKGROUND OF THE INVENTION

Typical engines have an exhaust system that include a filtration process for filtering particulates out of the exhaust stream so that the emissions exiting the exhaust system comply with regional environmental regulations and/or worldwide environmental regulations. These environmental standards and regulations are becoming stricter and require that the amount of Nitrogen Oxide (NOx), Hydrocarbon (HC), and Carbon Monoxide (CO) exiting the exhaust system are reduced in order to meet the standards set forth in the regulations. Additional emissions abatement components such as Selective Catalyst Reduction (SCR), Diesel Oxidation Catalysts (DOC), NOx Absorbing Catalyst (NAC), Lean NOx Trap (LNT), or a combination thereof may be required in the exhaust system so that the exhaust can be further cleaned (e.g. removal of NOx from the exhaust stream). The tightening of emission standards has required that more contaminates are removed from the exhaust stream. The addition of one or more of these components has reduced the amount of space available in the exhaust system. As exhaust components are added the overall fuel consumption is increased and there is a need to improve the overall fuel consumption and/or improve fuel economy. For example, one to three percent of the total fuel consumed is utilized performing regeneration cycles.

Regeneration of the particulate filters is performed when the particulate filters reach a target soot loading and/or it becomes increasingly difficult for the exhaust to pass through the particulate filter. Currently, there is no accurate way to calculate the actual soot load (i.e., target soot load) of a particulate filter; thus, regeneration cycles are triggered based upon fuel consumption, vehicle mileage, engine running time, and engine emission rates. Attempts have been made to trigger regeneration cycles based upon soot loading; however, the current particulate filters and particulate filter system have a relatively high variability in calculating the target soot load. Thus, the regeneration cycle is begun when the target soot load is achieved; however, the other process variables are set using the calculated maximum soot load so that the diesel particulate filter is not damaged. The maximum soot load for triggering a regeneration cycle may be calculated by taking the target soot load plus the variability in calculating a soot load. For example, the maximum soot load may be calculated by taking a target soot load of 5 grams/liter and adding the variability in calculating the soot load of ±2 grams/liter. Therefore, under this system the regeneration cycle will begin when the target soot load is 5 grams/liter. However, due to the variability in calculating the maximum soot loading the particulate filter may actually contain between about 3 grams/liter to about 7 grams/liter. Thus, due to the variability in calculating the target soot load of the particulate filters the inlet gas temperature may be set for the maximum soot load, which may result in increased regeneration times, higher or lower temperatures than the target temperatures, inconsistent efficiency from regeneration to regeneration, low regeneration efficiency, the regeneration cycle occurring below and/or above the target soot load, or a combination thereof.

Another challenge faced during regeneration of a particulate filter is maximizing the regeneration temperature without creating a "runaway" reaction or exceeding a temperature of about 800° C. so that exhaust system components are not damaged. Temperatures greater than about 1000° C. may cause the particulate filter to crack, melt, deactivate or reduce the efficiency of a catalyst coating on the particulate filter, or a combination thereof. If the particulate filter cracks, melts, or the catalyst coating is deactivated compliance with environmental regulations (e.g. regulations by the Environmental Protection Agency (EPA)) may not be met.

Currently, if a regeneration cycle is in progress and the engine speed is reduced to an idle, the temperature of the exhaust system drastically increases due to the reduced exhaust flow through the exhaust system and particularly the temperature of the particulate filter drastically increases. Attempts have been made to decrease the filter temperature by maintaining a high engine speed at idle so that a high air flow through the particulate filter is maintained. However, maintaining the engine at a higher speed during idle presents other challenges such as engine noise, emissions, and may also result in a fuel penalty. Some attempts to control the temperature of a diesel particulate filter during a regeneration cycle can be found in U.S. Pat. No. 7,275,365; and U.S. Patent Application Publication Nos. 2007/0193258; 2008/0016856; and 2009/0241512, incorporated by reference herein for all purposes. What is needed is a particulate filter and particulate filter control system that requires less packing space, reduces fuel consumption, increases the regeneration temperature, shortens the regeneration duration, improves regeneration efficiency, a reduced system cost for the exhaust system, or a combination thereof without causing a runaway reaction or damaging the components of the exhaust system.

SUMMARY OF THE INVENTION

The present invention seeks to solve one or more of these problems by providing improved control over the regeneration process of a particulate filter system by optimizing the size of the particulate filter, by determining the soot loading of the particulate filter more accurately, or both. Particularly, the present invention seeks to provide an improved diesel particulate filter and an improved diesel particulate filter control system. Particulate filter systems are installed in vehicles, diesel motors, or both. For example, particulate filter systems may be installed in cars, trucks, boats, heavy machinery, generators, or any other motor that uses fossil fuels to generate power. The particulate filter systems may have process parameters defined by manufacturers, environmental regulations, packaging space availability, or a combination thereof. The present invention seeks to implement better process control so that one or more of the defined process parameters may be achieved and even exceeded while improving system efficiency. The present invention may hold one or more of the process parameters constant (i.e., a defined process parameter) while adjusting one or more process variables so that a high regeneration cycle efficiency is achieved.

One possible embodiment of the present invention includes: a diesel particulate filter system comprising: a temperature sensor on the inlet side of the diesel particulate filter; a temperature sensor on the outlet side of the diesel particulate filter; a pressure sensor on the inlet side of the diesel particulate filter; a pressure sensor on the outlet side of the diesel particulate filter; and a control module in communication with the temperature sensors and the pressure sensor, and the control module is loaded with a look-up table that correlates the amount of soot loaded in the diesel particulate filter to a change in pressure measured by the pressure sensor; wherein the control module initiates a regeneration cycle when soot loading of the diesel particulate filter achieves a pre-determined soot load (i.e., target soot load).

Another possible embodiment of the present invention includes: a process of controlling a regeneration cycle of a diesel particulate filter comprising: obtaining a diesel particulate filter system as taught herein; measuring pressure on an inlet side and an outlet side of the diesel particulate filter; calculating a soot load of the filter based on the pressure change between the inlet side and the outlet side of the diesel particulate filter; calculating a target inlet gas temperature based on a maximum diesel particulate filter bed temperature isotherm that is a function of inlet gas temperature and soot load; controlling the temperature of the diesel particulate filter on the inlet side so that the measured inlet temperature is equal to the calculated target inlet gas temperature; performing a regeneration cycle at a target soot load mass; and calculating the duration of the regeneration cycle based on the calculated soot load, calculated temperature, and soot oxidation rate constant at the calculated inlet gas temperature of the diesel particulate filter so that a target regeneration rate is achieved (e.g. about 90 percent).

Another possible embodiment of the present invention further includes: a method of calculating a length of a diesel particulate filter for a filter system comprising; (a) providing a target pressure drop at a target soot load, target inlet gas temperature, and target volumetric flow so that the initial baseline filter length of the diesel particulate filter is determined; (b) calculating the maximum soot load based on a variability in soot load predictions based upon a pressure drop; (c) calculating a inlet gas temperature based on the maximum soot load calculated in step (b) using an inlet gas temperature look-up table; (d) calculating the regeneration duration using a target regeneration efficiency using a duration look-up table; (e) calculating a new target inlet gas temperature using the the inlet gas temperature look-up table so that the regeneration cycle efficiency is about 90 percent or greater; (f) calculating a new target soot mass load at the new inlet gas temperature and regeneration efficiency using the duration look-up table; (g) calculating the maximum soot load for the diesel particulate filter using the new target soot load and the variability in soot load predictions based upon a pressure drop; (h) calculating a new length of the diesel particulate filter using the new maximum soot load; (i) repeating steps (a) through (h) until the number of regenerations and the regeneration efficiency is the same or less than the baseline diesel particulate filter of step (a). The method of calculating a length of a diesel particulate filter for a filter system may further including the steps of: increasing the target inlet gas temperature and determining a new target soot mass with a regeneration efficiency of 90 percent or greater using the inlet gas temperature look-up table; calculating a maximum soot load capacity using the calculated target soot mass load and the variability in soot load predictions; and calculating a new diesel particulate filter length based upon the calculated maximum soot load capacity with a total amount of time spent during regeneration.

In one embodiment, the present invention provides a diesel particulate filtration system that has a reduced size and solves one or more of the problems discussed herein. The present invention provides a diesel particulate filter system where the amount of soot loading in the particulate filter may be accurately calculated. A more accurate soot load of the diesel particulate filter allows the system to regenerate at the optimum time and allows the temperature to be more accurately controlled so that the temperature of the diesel particulate filter during regeneration can be increased, the time of the regeneration cycle can be reduced, the efficiency of the regeneration can be increased, or a combination thereof.

The present invention seeks to reduce fuel consumption by controlling process parameters during the regeneration cycles. The present invention may be used with any combustion engine. The present invention as discussed herein may be used with a gasoline engine. Particularly, the present invention may be used with a diesel engine. The present invention as discussed herein may be used with any filter that has a substantially linear relationship between soot loading and pressure drop of the particulate filter. For example, by monitoring the pressure drop across the diesel particulate filter the amount of soot loading in the diesel particulate filter can be accurately calculated. The system of the present invention can increase the temperature of the diesel particulate filter during the regeneration cycle while reducing the chances of an uncontrolled reaction (i.e., runaway reaction) because the soot load of the diesel particulate filter is accurately measured. In increasing the regeneration temperature each regeneration cycle can be performed more quickly, the efficiency of the regeneration cycle can be increased, the overall fuel consumption required to perform regeneration cycles over the life of the diesel particulate filter can be reduced, or a combination thereof.

In another embodiment of the present invention the size (i.e. the length, diameter, cross sectional area, or a combination thereof) of the diesel particulate filter may be reduced without sacrificing performance or unnecessarily increasing the number of regeneration cycles needed to be performed. A reduction in the size of the diesel particulate filter may provide space in the exhaust system for the inclusion of other emission components, without reducing the efficiency of the diesel particulate filter, without reducing the efficiency of the exhaust system, reducing the system cost of the exhaust system, or a combination thereof. An optimum diesel particulate filter size may be calculated by measuring the pressure drop across the diesel particulate filter and using look-up tables so that the amount of fuel consumed during a regeneration cycle is decreased.

In yet another embodiment of the present invention the control system may regulate engine speed, exhaust gas recirculation, the throttle valve opening, or a combination thereof so that the temperature of the particulate filter may be controlled during a regeneration cycle when the engine speed is reduced to an idle. The present invention increases or maintains air flow through the diesel particulate filter when the engine speed is reduced to an idle such that heat is removed from the particulate filter and the peak outlet temperature is reduced so that the particulate filter is not damaged. Air flow and/or space velocity of exhaust may be controlled by either opening the throttle valve or maintaining the throttle valve in the open position when the engine speed is reduced. Air flow and/or space velocity of exhaust may further be increased by reducing or eliminating the amount of exhaust gas recirculation. The present invention is able to reduce the temperature of the particulate filter, to below temperatures that may damage the particulate filter, by increasing the throttle valve opening and/or decreasing exhaust gas recirculation for about two minutes or less when the regeneration cycle has progressed for five or less minutes before the speed of the engine is reduced to an idle.

DETAILED DESCRIPTION OF THE INVENTION

Figure 1:
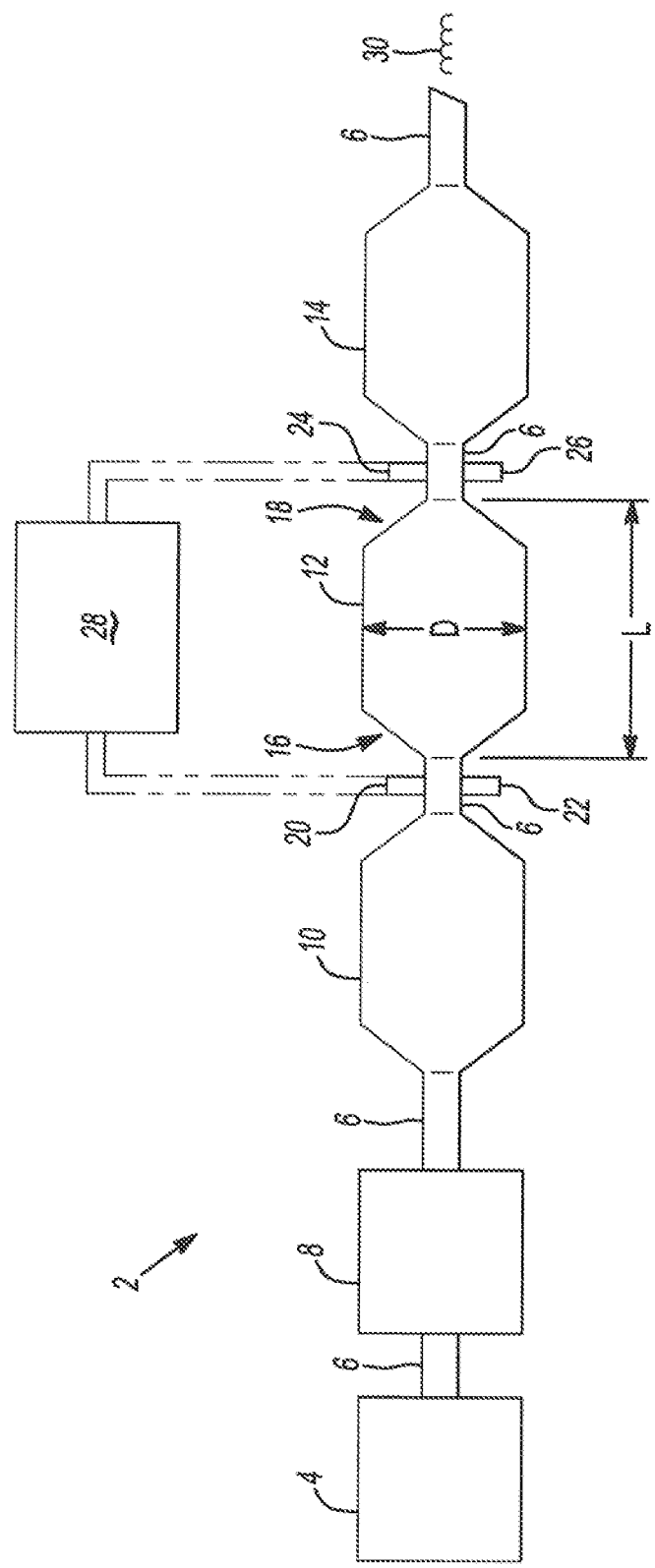
FIG. 1 illustrates one possible embodiment of the diesel particulate system in combination with an engine.

The following description of the preferred embodiment(s) is merely exemplary in nature and is in no way intended to limit the invention, its application, or uses.

The present invention is predicated upon providing an improved diesel particulate filter, an improved system for regeneration of a diesel particulate filter, and an improved method for designing a diesel particulate filter for a system. The present invention further regulates the engine so that when the engine speed is reduced to an idle while a regeneration cycle is in progress the temperature of the particulate filter is controlled and the particulate filter is not damaged.

An exhaust system includes a particulate filter. The particulate filter may be made of any material suitable that removes soot from an exhaust stream, and particularly from a diesel engine exhaust stream. Preferably, the diesel particulate filter may be made of any material that exhibits substantially linear characteristics that correspond soot load to pressure drop across the diesel particulate filter. For example, a majority of the data plot is linear such as about 70 percent or more, preferably about 80 percent or more, or more preferably about 90 percent or more, or most preferably about 95 percent or more. The diesel particulate filter may be made of a ceramic material that can be designed to filter soot out of an exhaust stream, provide sufficient air flow for the engine to function well, and which can withstand the conditions of exhaust (e.g. temperature, pressure, corrosion, moisture, the like, or a combination thereof). The diesel particulate filter may be made of Acicular Mullite, Corderite, Silicon Carbide (SiC), Aluminum Titinate, or mixtures thereof that may artificially include a discriminating layer. The discriminating layer may be any layer on the filter that allows the soot to collect evenly on and/or within the particulate filter so that the soot loading and the pressure drop have a substantially linear relationship. The discriminating layer may be any layer used with a filter that creates a surface for soot to collect on. The discriminating layer may be any layer that prevents the soot from initially filling the pores of the particulate filter before forming a soot cake. Preferably, the diesel particulate filter may be made of Acicular Mullite that does not include a discriminating layer. More preferably, the diesel particulate filter may be made of Acicular Mullite.

The diesel particulate filter may be any size suitable to remove soot from an exhaust stream so that the exhaust exiting the exhaust system meets environmental standards. The size of the diesel particulate filter may vary depending on the size of the engine and defined operating conditions. The diesel particulate filter may have a length of about 51 cm (e.g. about 20 in) or less, a length of about 38 cm (e.g. about 15 in) or less, a length of about 30.5 cm (e.g. about 12.0 inches) or less, about 28 cm (e.g. about 11.0 inches) or less, preferably about 23 cm (e.g. about 9.0 inches) or less, or more particularly about 20 cm (e.g. about 8.0 inches) or less (i.e. about 20.8 cm or about 8.2 inches). The length of the diesel particulate filter may be even further downsized so that the length of the filter is about 18 cm (e.g. about 7.0 inches) or less or even about 15 cm (e.g. about 6.0 inches) or less (e.g. about 18.5 cm to about 16.5 cm or about 7.3 inches or about 6.5 inches). The diesel particulate filter may have a diameter. The diameter of the diesel particulate filter may be about 38 cm (e.g., about 15 in) or less, about 31 cm (e.g., about 12 in) or less, about 25 cm or less, or even about 20 cm or less. The diameter of the diesel particulate filter may be between about 20 cm (e.g. about 8 in) and about 25 cm (e.g. about 10 inches (i.e. about 23 cm or about 9 inches)). The diesel particulate filter may have a cross sectional area. The cross section area may be about 1500 cm² or less, about 1200 cm² or less, or about 1000 cm² or less. The cross sectional area may be about 300 cm² or more, about 400 cm² or more, or about 500 cm² or more.

The present invention may use defined operating parameters to optimize regeneration efficiency, calculate soot handling capacity, calculate the size of the system, or a combination thereof. Defined operating parameter or defined parameter may be any process parameter that may be chosen, set, or calculated to optimize performance of the system or may be a predetermined constant. For example, in order to choose a target soot handling capacity a pressure drop may first be determined for a filter of a given size that does not adversely affect engine performance and then the pressure drop is correlated to the soot handling capacity of the system. Thus, in this example, the defined operating parameters are the size of the filter and the pressure drop for the given filter. Examples of defined process parameters may be the size of the filter, material composition of the filter, pore size of the filter, outlet temperature, inlet temperature, pressure drop, duration of the regeneration cycle, soot loads, mass flow rates, space velocities, or a combination thereof. Some of the defined operating parameters may be predetermined by equipment manufacturers, environment regulations, design choices, space limitations, or a combination thereof. Some of the defined operating parameters may be used as process variables. For example, one of the process parameters (i.e., a process variable) may be calculated or changes while maintaining the defined process parameters constant.

The diesel particulate filter may include a target soot handling capacity. The target soot handling capacity may increase, decrease, or a combination thereof depending on the material of the diesel particulate filter, the size (e.g. length, diameter, cross sectional area, or a combination thereof) of the diesel particulate filter, the defined operating parameters, or a combination thereof. The target soot handling capacity may be chosen by picking a soot capacity that correlates to a change in pressure. Preferably, the target soot handling capacity may be chosen so that the increase in pressure and/or decrease in air flow through the particulate filter is not so great that engine performance is affected. More preferably, the target soot handling capacity may be the amount of soot loaded in the diesel particulate filter that triggers a regeneration cycle without reducing the amount of air flow through the diesel particulate filter so that heat is removed and/or the back pressure of the diesel particulate filter does not increase so as to adversely affect engine performance. The diesel particulate filter may have a target soot handling capacity of about 95 grams or less, about 75 grams or less, or about 55 grams or less. The diesel particulate filter may be have a target soot handling capacity of about 15 grams of soot of greater, preferably about 25 grams of soot or greater, or more preferably about 35 grams of soot or greater (e.g. between about 38 and about 48 grams). The diesel particulate filter may be loaded with about 5.0 grams/liter of soot or greater, about 6 grams/liter of soot or greater, about 7 grams/liter of soot or greater, or about 8 grams/liter of soot or greater. The diesel particulate filter may be loaded with about 11 grams/liter of soot or less, about 10 grams/liter of soot or less, or about 9 grams/liter of soot or less. The diesel, particulate filter may be loaded with between about 3 to about 8 grams/liter of soot. Preferably, the diesel particulate filter may be loaded with between about 5 to about 7 grams/liter of soot.

The diesel particulate filter may have a maximum soot handling capacity (i.e., max soot load). The maximum soot handling capacity may calculated by taking the target soot handling capacity and adding the variability in calculating a soot load. The variability in calculating a soot load (i.e. soot mass predictability) based upon pressure drop may be about ±3 g/L or less, preferably about ±2.0 g/L or less, more preferably about ±1.0 g/L or less, or most preferably about ±0.5 g/L or less. The soot mass predictability correlates to a low hysteresis and vice versa. The hysteresis of the diesel particulate filter may be about ±3 g/L or less, preferably about ±2.0 g/L or less, more preferably about ±1.0 g/L or less, or most preferably about ±0.5 g/L or less. The maximum soot holding capacity may vary based upon the size of the filter. For example a filter that is 28 cm long and 23 cm in diameter may hold more soot than a filter that is 18 inches long and 23 cm in diameter. The maximum soot handling capacity of the diesel particulate filter may be about 200 grams or less, about 150 grams or less, about 100 grams or less. The maximum soot handling capacity of the diesel particulate filter may be about 10 grams or more, 20 grams or more, or even 30 grams or more (e.g. between about 41 grams and about 52 grams). The maximum soot handling capacity may vary based upon the composition of the filter. For example, filters made of cordierite, aluminum titanate, acicular mullite, silicone carbide, or mixtures thereof may each have different a variability, a different maximum soot handling capacity (i.e., maximum soot load), or both. The maximum soot handling capacity may be used with the inlet gas temperature look-up table to calculate an inlet gas temperature that may not exceed a maximum outlet temperature so that the diesel particulate filter is not damaged.

The diesel particulate filter may include an operating soot handling capacity. The operating soot handling capacity may be any amount that allows the particulate filter to function properly without damaging the filter. The operating soot handling capacity may be any amount that allows the particulate filter to function properly and minimize the number of regeneration cycles. The operating soot handling capacity may be the amount of soot removed from the filter during a regeneration cycle. For example, if the target soot handling capacity is 50 grams and the regeneration efficiency is 90 percent the operating soot handling capacity is 45 grams. The operating soot handling capacity may be the amount of soot that is loaded into the diesel particulate filter and the subsequently removed from the diesel particulate filter during a regeneration cycle. The operating soot handling capacity may be about 150 grams or less, about 100 grams or less, or about 50 grams or less. The operating soot handling capacity may be greater than about 20 grams or more, about 25 grams or more, or about 30 grams or more (e.g. between about 34 grams and about 43 grams).

The diesel particulate filter system may include one or more temperature sensors. Preferably, the diesel particulate filter system includes at least one temperature sensor on the inlet side of the diesel particulate filter and at least one temperature sensor on the outlet side of the diesel particulate filter. However, the particulate filter system may function without any temperature sensors. The temperature sensor may be any temperature sensor suitable for measuring the temperature of an exhaust stream. For example, a thermocouple, a thermistor, a resistive temperature detector (RTD), a negative coefficient temperature sensor, a positive coefficient temperature sensor, or a combination thereof may be used to measure the temperature of the system. The temperature sensor may be any temperature sensor that may withstand the conditions of the exhaust. The at least one temperature sensor may be any temperature sensor that may withstand temperatures of about 500° C. or greater, preferably a temperature of about 800° C. or greater, or more preferably about 1000° C. or greater (i.e. between about 700° C. to about 900° C.). Preferably, if only one temperature sensor is used it is on the inlet side of the particulate filter.

The diesel particulate filter system may include one or more pressure sensors. The one or more pressure sensors may be located on the outlet side of the diesel particulate filter, the inlet side of the diesel particulate filter, or both. Preferably, if only one pressure sensor is used the pressure sensor may be on the inlet side of the diesel particulate filter. More preferably, a pressure sensor may be located on both the inlet side and the outlet side of the diesel particulate filter. The pressure sensor may be any pressure sensor that can withstand the conditions of the exhaust. The at least one pressure sensor may be any pressure sensor that may withstand temperatures of about 500° C. or greater, preferably a temperature of about 800° C. or greater, or more preferably about 1000° C. or greater (i.e. between about 700° C. to about 900° C.).

The diesel particulate filter system may include one or more control modules (e.g. an onboard computer or the vehicle's computer). The one or more control modules may be in communication with the one or more temperature sensor, the one or more pressure sensor, or a combination thereof. The control module may be located inside the exhaust system. Preferably, the control module will be located outside of the exhaust system, and in communication with the sensors that are monitoring the inside of the exhaust system. The one or more control modules may include one or more programs. The one or more programs may include one or more look-up tables. Preferably, the control module will be loaded with at least three look-up tables. For example, the control module may include a pressure drop look-up table, a inlet gas temperature look-up table, a duration look-up table, or a combination thereof.

The one or more look-up tables may be created by the controller as the controller monitors the diesel particulate filter before, during, and after a regeneration cycle (e.g. plotting the data monitored by the sensors and referring to the plotted data to control performance). Preferably, the look-up tables may be created and loaded into the control module before the diesel particulate filter system is installed in a vehicle. The look-up tables may be created based upon theoretically calculated data. The look-up tables may be created by actual test data. The look-up tables may be pre-loaded into the controller and the control module may interpolate or extrapolate real time date to achieve a calculation using the one or more look-up tables and archived data points stored in the control module. The look-up tables may assist the controller in determining the amount (e.g. grams) of soot that is contained in the diesel particulate filter based upon the amount of pressure drop across the diesel particulate filter, the inlet gas temperature, the peak outlet gas temperature, length of the particulate filter, space velocities of the exhaust, diameter of the particulate filter, defined parameters, or a combination thereof. For example, the pressure drop look up table may be used to calculate the amount of soot in a given particulate filter (e.g. a 9 in by 11 in filter) by measuring the pressure drop across the particulate filter. The look-up tables may assist the controller in determining the inlet gas temperature that may be used with for a maximum soot load of a particulate filter without damaging the particulate filter. The look-up tables may assist the controller in determining the duration of a regeneration cycle and/or regeneration efficiency for a diesel particulate filter given an inlet gas temperature, outlet gas temperature, filter size (i.e. length, diameter, cross sectional area, or a combination thereof), material of the filter, soot load (e.g. maximum or target soot loads), defined parameters, or a combination thereof.

The diesel particulate filter may be regenerated by an active regeneration cycle or a passive regeneration cycle. A regeneration cycle as discussed to herein is referring to an active regeneration cycle. An active regeneration cycle occurs when fuel (e.g. diesel fuel) is injected into the exhaust system and the fuel ignites to heat the soot in the particulate filter so that the soot is converted into carbon dioxide, carbon monoxide, or both. A passive system occurs continuously during the running process of the diesel engine. For example, as nitrogen oxide (NOx) enters the particulate filter the soot in the diesel particulate filter may oxidize by the $NO_2$ and convert the soot (e.g. carbon) into carbon dioxide, carbon monoxide, or both. The rate of passive regeneration of the particulate filter may affect the calculated soot load of the diesel particulate filter; thus, the amount of soot load may be adjusted to compensate for the amount of soot removed passively. Preferably, a passive regeneration may not affect a filter with no hysteresis and calculating the target and/or maximum soot handling capacity. Passive regeneration may be one parameter considered when triggering a regeneration cycle.

The time to regenerate a diesel particulate filter may be affected by the temperature of the diesel particulate filter during the regeneration cycle, the ability to accurately control the temperature during the regeneration cycle, or both. The temperature of the diesel particulate filter during a regeneration cycle may be between about 500° C. and about 700° C., preferably between about 525° C. and about 675° C., and more preferably between about 575° C. and about 650° C. The time of the regeneration cycle may be affected by the accuracy in calculating the soot load of the diesel particulate filter. The amount of time a regeneration cycle lasts may be a product of maximum soot load and the inlet gas temperature. For example, the more soot loaded into the diesel particulate filter the higher the temperature may become during the regeneration cycle. Thus, accurately calculating the soot load of the filter may enable the temperature during the regeneration cycle to be increased without causing a "runaway" reaction. As discussed herein a "runaway" reaction may result in damage to the exhaust system and its components. The present invention reduces the temperature of the particulate filter during an uncontrolled reaction (e.g., a runaway reaction) and/or reduces the the chances of an uncontrolled reaction occurring so that the particulate filter is not damaged.

The efficiency of the regeneration cycle may be controlled by controlling one or more of the process conditions, process parameters, or both as defined herein. For example, if the controller calculates a soot load of 100 grams and the actual soot load is 120 grams the reaction during the regeneration cycle may become a runaway reaction due to the diesel particulate filter having too much soot (i.e. fuel). In another example, if the controller calculates a soot load of 100 grams and the actual soot load is 80 grams then the regeneration cycle may be inhibited and result in a lower efficiency (e.g. less soot is burned out of the filter, thus, the regeneration cycle will have to occur again more quickly and/or the regeneration temperature is lower causing the regeneration cycle to be longer). For these reasons, being able to accurately calculate the soot loading of the diesel particulate filter reduces the chances of a runaway reaction or a regeneration cycle with a low efficiency.

Regeneration efficiency is the percentage of soot located in the filter that is converted from carbon to carbon dioxide ($CO_2$) or carbon monoxide (CO) and removed from the diesel particulate filter. The present invention may remove about 75 percent or greater of the soot from the filter. Preferably, the present invention removes about 85 percent or greater of the soot from the filter. More preferably, the present invention may remove about 90 percent or greater of the soot from the filter. For example, if the diesel particulate filter is loaded with 100 grams of soot the present invention removes about 90 grams or more of the soot from the diesel particulate filter (e.g. about 90 percent of the soot is removed or the regeneration cycle is about 90 percent efficient).

The regeneration cycle duration may be performed for a duration that may vary so that a defined set of parameters may be achieved. The regeneration cycle may be performed in about 40 minutes or less. The regeneration cycle may be performed in about 30 minutes or less, preferably about 25 minutes or less, more preferably about 20 minutes or less, even more preferably about 16 minutes or less, or most preferably about 14 minutes or less. The time required to perform a regeneration cycle may be reduced by about 10 percent or more, about 15 percent or more, about 20 percent or more, about 30 percent or more, preferably about 40 percent or more, more preferably about 45 percent or more, or most preferably about 50 percent or more. The duration of a regeneration cycle may be determined by a look-up table (i.e., a duration look-up table).

The duration of the regeneration cycle may be a pre-set duration based upon defined parameters (e.g. soot load, inlet gas temperature, filter size, outlet temperature, or a combination thereof). For example, the higher the higher the inlet temperature the faster the regeneration cycle is completed. The duration of the regeneration cycle at a given temperature may be long enough so that the diesel particulate filter has 80 percent or greater of the soot removed, and preferably 90 percent or greater of the soot removed. The duration of a regeneration cycle may be determined by calculating the amount of time required to achieve a given regeneration cycle efficiency at a given inlet gas temperature. For example, the duration may last until the 70 percent or more, 80 percent or more, or preferably 90 percent or more of the soot is removed from the diesel particulate filter.

The duration of the regeneration cycle may vary based upon the soot oxidation temperature (i.e. the inlet gas temperature). For example, if the soot inlet temperature is 600° C. the duration will be one time length (e.g. about 17 minutes to remove 35 g) and if the soot inlet temperature is 625° C. the duration may be a shorter duration (e.g. about 11 minutes to remove about 35 g). The duration of the regeneration cycle may not be linear from inlet temperature data plot curve. For example, the higher the inlet gas temperature the steeper the slope of the data plot curve.

A duration look-up table may be used to improve regeneration efficiency. Preferably, the duration look-up table may be used to increase regeneration efficiency to about 90 percent or greater without increasing the risk of damage to the particulate filter. The duration look-up table may be used to determine regeneration efficiency for a given duration. For example, if the duration of a regeneration cycle is 38 minutes and the inlet gas temperature is 565° C. and a 75 percent efficiency, the duration look up table may be used to determine that a 90 percent efficiency may be achieved at 600° C. in 23 minutes.

The improved diesel particulate filter and diesel particulate filter control system may reduce the amount of fuel used during the lifetime of the diesel particulate filter. Preferably, the improved diesel particulate filter and diesel particulate filter control system may reduce the amount of fuel used during each regeneration cycle. The present invention may reduce the amount of time required for each regeneration cycle so that less fuel is required to perform each regeneration cycle, the regeneration efficiency is increased such that the regeneration cycles occur less frequently, or both. The amount of fuel required for each regeneration cycle of the diesel particulate filter may be reduced by about 10 percent or more, about 20 percent or more about 25 percent or more, preferably by about 30 percent or more, more preferably by about 35 percent or more, or even more preferably about 40 percent or more. The amount of fuel used during each regeneration cycle may be reduced by increasing the temperature of the regeneration cycle. The amount of fuel required overall for the engine may be reduced by about 0.25 percent or more, preferably by about 0.5 percent or more, more preferably by about 0.75 percent or more, or even more preferably about 1.0 percent or more. The total amount of fuel used by the motor may be reduced by decreasing the amount of time the particulate filter spends in regeneration and/or by achieving a higher regeneration efficiency so that operating soot mass is higher.

The controller and components discussed herein may be used with a process so that the regeneration cycles are controlled. The system may measure the pressure created by the fluid flow on the inlet side of the diesel particulate filter. The system may measure the pressure of the fluid on the outlet side of the filter. The outlet side of the diesel particulate filter may not include a pressure sensor. The pressure on the outlet side of the diesel particulate filter may remain constant regardless of the pressure on the inlet side of the diesel particulate filter. The pressure may be measured by one or more of the pressure sensor discussed herein. The pressure measurements may be communicated to the control module so that a calculation may be performed.

The control module or some other computing device (e.g. the vehicle's computer system) may intake the measurements taken by the one or more pressure sensors. The pressure drop across the diesel particulate filter may be calculated by subtracting the outlet pressure from the inlet pressure so that the pressure drop is calculated (i.e. the low pressure is subtracted from the high pressure). The outlet pressure may be a constant value such that the constant is subtracted from the inlet pressure to arrive at the pressure drop. The pressure drop may correlate with one or more look-up table.

A look-up table may include a pressure drop that correlates the amount of pressure drop with the amount of soot contained in the diesel particulate filter (i.e. a pressure drop look-up table). The amount of pressure drop and the amount of soot contained in the diesel particulate filter may have a curved correlation (e.g. an exponential curve). Preferably, the amount of pressure drop and the amount of soot contained in the diesel particulate filter may have substantially linear correlation across at least a portion of the curve (e.g., a data plot). For example, the linear region of the data plot may be about 50 percent or more, preferably about 75 percent or more, more preferably about 90 percent or more, or even more preferably about 95 percent or more of the total length of the data plot. Most preferably, the data plot may be linear across the entire length of the data plot. The correlation between the pressure drop and the amount of soot in the diesel particulate filter may be affected by the length, diameter, cross sectional area, or a combination thereof of the diesel particulate filter. For example, a pressure drop of about 22.5 kPa (e.g. about 225 mbar) of a diesel particulate filter that is 8.2 inches long may result in a soot load of 58 grams, and a pressure drop of 22.5 kPa (e.g. about 225 mbar) of a diesel particulate filter that is 6.5 inches long may result in a soot load of 38 grams. Thus, when the look-up table is loaded into the control module the length of the corresponding diesel particulate filter being used may be taken into consideration by the electronic control unit calibration group.

The control module may control the regeneration cycle based on the calculated soot load in the diesel particulate filter, the inlet gas temperature, or both so that the diesel particulate filter is not damaged. The control module may have a target soot load on the look-up table and when the corresponding pressure drop is achieved the control module triggers a regeneration cycle so that the optimum temperature for regeneration is achieved during each regeneration cycle and the regeneration efficiency meets a defined percentage such as about 90 percent or greater. The temperature of the regeneration cycle may be controlled by performing the regeneration cycles at higher or lower soot loads, by increasing or decreasing the inlet gas temperature, or a combination thereof. For example, if a higher temperature is desired then the regeneration cycle will not begin until more soot is loaded into the diesel particulate filter while maintaining the inlet gas temperature constant or by maintaining the soot load constant and increasing the inlet gas temperature, or both. For example, if a lower temperature is desired then the regeneration cycle may be performed at a lower soot load.

The control module may continuously or intermittently measure the temperature and pressure on the outlet side, the inlet side, or both sides of the diesel particulate filter. Preferably, the control module at least measures the temperature on the outlet side of the diesel particulate filter during a regeneration cycle. More preferably, the control module measures the temperature on the inlet side and the outlet side of the diesel particulate filter. The control module may control the regeneration cycle if the temperature on the outlet side of the diesel particulate filter becomes too high. For example, if the temperature becomes too high the control module may reduce the amount of fuel being added so that the regeneration temperature is reduced. In another example, the control module may lower the target soot load for the next regeneration cycle so that the amount of soot in the diesel particulate will be reduced and the temperature will be lowered in order to avoid a "runaway" reaction. The control module may not measure the temperature of the inlet gas temperature, the outlet gas temperature, or both of the particulate filter during a regeneration cycle. The control module may calculate the inlet gas temperature based upon the amount of fuel added to the exhaust stream during a regeneration cycle. The control module may calculate the outlet gas temperature based upon soot load, inlet gas temperature, the amount of fuel injected into the exhaust stream, or a combination thereof.

The control module may include a look up table for calculating a target inlet gas temperature (i.e. exhaust entering the diesel particulate filter). The target inlet gas temperature may be determined by correlating the maximum particulate filter bed temperature isotherm to a soot load of the particulate filter. The particulate filter bed temperature isotherm may correlate to the outlet gas temperature; therefore, lowering the outlet gas temperature lowers the bed temperature isotherm. The inlet gas temperature may affect the duration of the regeneration cycle, the maximum temperature of the diesel particulate filter during the regeneration cycle, the regeneration efficiency, or a combination thereof. For example, a higher inlet gas temperature may accelerate the oxidation reaction and cause the temperature of the diesel particulate filter to increase, which shortens the regeneration cycle time and increases regeneration efficiency. The inlet gas temperature may be increased by adding fuel to the inlet gas stream that ignites and heats up the inlet gas stream. The inlet gas temperature may be decreased by decreasing the amount of fuel added to the inlet gas stream. The inlet gas temperature may be constant for the entire duration of a regeneration cycle, thus, the entire regeneration cycle may include only one stage (i.e. one inlet gas temperature). For example, the inlet gas temperature may be set at 620° C. degrees and this temperature may be maintained for the entire duration of the regeneration cycle. The inlet gas temperature may include only one stage in the beginning of a regeneration cycle. For example, the inlet gas temperature may be maintained at 585° C. for the first zero to about ten minutes, preferably about one to about 8 eight minutes, or more preferably about 3 to about 5 minutes before the inlet gas temperature is changed. The regeneration cycle may include a plurality of stages during a regeneration cycle. For example, the controller may continuously increase the inlet gas temperature throughout the entire regeneration cycle. The controller may be used to recalculate the duration of the regeneration cycle based on the changes in the inlet gas temperature. For example, if the inlet gas temperature is increased from 585° C. to 600° C. the regeneration cycle may achieve 90 percent regeneration in a duration that is about 2 minutes less.

A temperature sensor (i.e. a thermistor) may be used to regulate the amount of fuel added to the inlet gas so that the actual inlet gas temperature is substantially the same as the target inlet gas temperature. For example, if the actual inlet gas temperature exceeds the target gas temperature the thermistor may reduce the amount of fuel being added to the inlet gas so that the actual inlet gas temperature is reduced. Controlling the inlet gas temperature may control the maximum diesel particulate filter bed temperature isotherm. For example, by increasing the temperature of the inlet gas temperature the diesel particulate filter bed temperature isotherm may be increased. The temperature of the diesel particulate filter bed temperature isotherm may also be controlled by controlling the amount of air flow through the exhaust system. For example, if the amount of air flow through the diesel particulate filter is increased then the amount of heat removed from the diesel particulate filter may increase and the temperature of the diesel particulate filter will decrease.

The inlet gas temperature may be increased to a target inlet gas temperature and held constant for the duration of the regeneration cycle. The inlet gas temperature may be increased to a target inlet gas temperature and then raised in steps thereafter by recalculating the target inlet gas temperature based upon the amount of soot remaining in the particulate filter. The inlet gas temperature may be constantly increase through the duration of a regeneration cycle as the soot load gradually decreases so that the regeneration efficiency may be maximized and the duration of the regeneration cycle may be minimized.

The present invention may further include a method of designing a system that includes a step of calculating the most efficient size (e.g. length) of the diesel particulate filter described herein for an engine so that the regeneration cycles result in in a high regeneration efficiency, reduced fuel consumption, increased regeneration temperature, reduced regeneration cycle duration, the packaging size of the filter is reduced, or a combination thereof. One standard sized particulate filter for all engines may not result in efficient regeneration cycles for every engine that the particulate filter is used in; therefore, being able to calculate the optimum size of a filter using pressure drop, soot loading, inlet gas temperature, or a combination thereof may enable the user and/or the manufacturer to install a filter that will result in more efficient regeneration cycles.

A target pressure drop may be selected so that the optimum sized filter may be calculated. The target pressure drop may be any pressure drop. Preferably, the target pressure drop will be a pressure drop that is less than the difference between a new filter and a filter that is completely fully of soot. A target pressure drop may be chosen so that the engine performance is not substantially reduced. A target pressure drop may be chosen so that the diesel particulate filter soot holding capacity is high enough so that regeneration cycles may be minimized. A target inlet gas temperature may be selected. The target inlet gas temperature may be the normal operating temperature of the engine during normal to rated conditions (i.e., while the engine is running not at idle and up to the engine is operating on a torque curve). A target volumetric flow may be selected. The target volumetric flow may be the normal operating volumetric flow of the engine during normal to rated conditions (i.e., while the engine is running not at idle and up to the engine is operating on a torque curve). For example, the target volumetric flow may be the amount of cubic feet of exhaust that are moved through the diesel particulate filter per minute. A volumetric flow rate, space velocity, or both may be chosen so that heat is removed from the particulate filter and the particulate filter is not damaged. A volumetric flow rate, space velocity, or both may be chosen so that enough exhaust is removed from the exhaust system so that the engine is not choked and/or shut down.

An initial target length of the diesel particulate filter may be calculated based upon the target pressure drop and a target soot load amount (e.g. grams of soot the filter can hold). The initial target length of the diesel particulate filter may be calculated by using a look-up table. Preferably, the initial target length of the diesel particulate filter may be calculated by using the pressure drop look-up table.

The maximum soot handling capacity (i.e. maximum soot load) of the diesel particulate filter may be calculated by subtracting the soot loading variability from the target soot load for a diesel particulate filter of the "calculated" initial target length. As discussed herein the target soot load may be selected as a function of soot load capacity and pressure drop.

The inlet gas temperature used during a regeneration cycle may be calculated based upon the predicted maximum soot load. The more accurately the maximum soot load can be predicted the higher the inlet gas temperature may be used during a regeneration cycle so that the possibility of a "runaway" reaction is reduced. The inlet gas temperature may be calculated by using a look-up table. Preferably, the inlet gas temperature may be calculated using an inlet gas temperature look-up table that includes the maximum soot load and a target maximum outlet temperature.

The present invention may be used to downsize the diesel particulate filter, reduce the amount of time the diesel particulate filter spends being regenerated, reduce fuel consumption to regenerate the diesel particulate filter, or a combination thereof. The present invention contemplates a method of using one or more of the look-up tables to achieve one or more of the advantages discussed herein. The diesel particulate filter may be downsized by determining the target process parameters of the diesel particulate filter currently being used, the manufacturer's target parameters, environmental target parameters, or a combination thereof. A new particulate filter size (e.g. length, diameter, cross sectional area, or a combination thereof) may be chosen that may achieve the target process parameters that have been determined. The pressure drop look-up table may be used to calculate some of the target process parameters using other determined process parameters and/or provided process parameters. Once the target process parameters (e.g. determined process parameters) have been obtained the maximum inlet gas temperature, which may not damage the particulate filter, may be calculated for the downsized particulate filter using the maximum soot load for the given filter. Some examples of target process parameters that may be provided are: initial length of the diesel particulate filter, pressure drop at an intake mass flow rate, inlet gas temperature, material composition of the filter, maximum soot load mass, target soot load mass, operating soot load mass, duration of the regeneration cycles, frequency of the regeneration cycles, or a combination thereof. The maximum soot load may be provided; however, the maximum soot load may be calculated using a target soot load and a maximum hysteresis for the material of the particulate filter. The duration of the regeneration cycle may be calculated using the duration look-up table. The duration of the regeneration cycle may be calculated using an operating soot load, a known regeneration efficiency for the give size filter and/or the inlet gas temperature, a target regeneration efficiency, or a combination thereof. The inlet gas temperature to achieve a regeneration efficiency may be calculated for the given particulate filter using the calculated duration, the target process parameters, an operating soot mass load, or a combination thereof and the duration look-up table. The maximum soot load for the downsized filter may be calculated using the duration look-up table, the known maximum hysteresis for the material of the particulate filter, the new target soot load, or a combination thereof. A new filter size (e.g. length, diameter, cross sectional area, or a combination thereof) may be calculated based upon the calculated maximum soot load capacity. The new filter size (e.g. length, diameter, cross sectional area, or a combination thereof) may be smaller than the downsized particulate filter. These steps may be repeated one or more times until the number of regenerations, the regeneration duration, or both are the same or lower than the baseline downsized filter.

The size (e.g. length, diameter, cross sectional area, or a combination thereof) of the particulate filter may be downsized and achieve the same or similar fuel consumption; however, optimization steps may be performed, which improve fuel efficiency so that less fuel is used in each regeneration cycle. The downsized particulate filter, which has been calculated that does not impact the pressure drop, the number of regeneration cycles, the regeneration duration, or a combination thereof may be further optimized for fuel efficiency and possible even further downsized. The target inlet gas temperature for the given filter may be increased by a given amount (e.g. about 10° C., 20° C., 25° C., or the like). The target soot mass load may then be calculated for the given particulate filter based upon the increased inlet gas temperature and an operating efficiency of 90 percent using the duration look-up table. The size (e.g.

length, diameter, cross sectional area) of the particulate filter required to achieve the new target soot mass at the given regeneration efficiency and target inlet gas temperature may be calculated. The regeneration frequency and total amount of time spent performing regenerations may be calculated using the duration look-up table. The total time that the new particulate filter spends in regeneration may be compared to the baseline downsized filter. If, however, the total time is not less than the downsized baseline the process may be repeated until total regeneration time is decreased. If the total time is less than the baseline downsized filter than the fuel efficiency has been improved. The process may be repeated for more improvements; however, limitations may be placed on the minimum size of the filter based upon frequency of regeneration, ash storage, or both.

The exhaust system may include a control module, a controller, a computer, an onboard computer system, or a combination thereof that is in communication with the exhaust system. Preferably, an on board computer will be used with the present invention. The computer may be capable of monitoring one or more conditions of the engine, the exhaust system, or both. Preferably, the computer monitors the speed of the engine. For example, the computer may monitor the speed of the engine so that when a vehicle is not in motion the engine speed is reduced to an idle. More preferably, the computer monitors and controls the speed of the engine, the throttle valve, the exhaust gas recirculation system, or a combination thereof.

The computer may monitor the engine speed. Preferably, the computer may monitor engine speed once a regeneration cycle is initiated so that the exhaust system and particularly the particulate filter are not damaged. The computer may monitor engine speed continuously. The computer may monitor engine speed intermittently. The computer may monitor engine speed only when a regeneration cycle has begun. The engine speed may be maintained at an idle speed for the duration of the regeneration cycle. The speed of the engine may not be increased to control the volume of air that passes through the particulate filter. The computer may control the volume of air flow through the particulate filter without changing the speed of the engine.

The computer may monitor the duration of a regeneration cycle. The computer may monitor the duration of a regeneration cycle so that a target regeneration efficiency is achieved. The computer may monitor the duration of a regeneration cycle so that the computer may stop increasing the inlet gas temperature to the particulate filter. Preferably, the computer monitors the duration of a regeneration cycle so that the particulate filter is not damaged when a drop to idle occurs during a regeneration cycle. More preferably, the computer monitors the duration of a regeneration cycle so that if a drop to idle occurs the computer may take appropriate measures as described by the present invention herein. The computer may monitor the duration of the regeneration cycle at the target inlet gas temperature.

The computer may monitor the duration of the regeneration cycle. The computer may measure the entire duration of the regeneration cycle. The computer may measure the duration of the regeneration cycle for only the beginning of the regeneration cycle. For example, depending on the material that the particulate filter is composed of the regeneration cycle may be monitored for about 15 minutes or less, about 10 minutes or less, preferably about 8 minutes or less, or more preferably about 6 minutes or less. The computer may monitor the regeneration cycle for the entire duration of the regeneration cycle; however, the computer may only react to a change in engine speed in the beginning of a regeneration cycle. For example, the computer may measure the duration the regeneration cycle and if a drop to idle occurs 10 minutes after the regeneration cycle has begun the computer may take no action. In another example, the computer may measure the duration of the regeneration cycle and if a drop to idle occurs within the first 5 minutes of of the regeneration cycle the computer may change process parameters such as the throttle valve position, the exhaust gas recirculation, or both. The computer may change process parameters if a drop to idle happens after about 10 minutes or less, about 7 minutes or less, preferably about 6 minutes or less, or more preferably about 5 minutes or less. Depending on the material used to make the particulate filter the amount of time that the computer may adjust process parameters may be varied.

The throttle valve may be positioned based upon standard operating parameters (i.e. a regeneration cycle is not occurring). The throttle valve opening may be positioned based upon operating parameters for operation during a regeneration cycle. The positioning of the throttle valve may be any position that allows enough air flow through the particulate filter so that the particulate filter is not damaged. The throttle valve may be fully open during a regeneration cycle when the engine drops to idle. The throttle valve may remain and/or be maintained in an open position (i.e. not closed) if the engine drops to idle during a regeneration cycle. The throttle valve may remain in a substantially open position if the engine drops to idle during a regeneration cycle. For example, the throttle valve may remain in a position of about 60 percent open or more, about 70 percent open or more, preferably about 80 percent open or more, or more preferably about 90 percent open or more.

The exhaust gas recirculation may be controlled using standard control parameters during normal operation (i.e. a regeneration cycle is not occurring). The exhaust gas recirculation may be controlled using standard control parameters during a regeneration cycle. The exhaust gas recirculation may be controlled using regeneration cycle control parameters during a regeneration cycle. The controller may use standard operating parameters for a portion of the regeneration cycle and regeneration cycle control parameters for a portion of the regeneration cycle. The exhaust gas recirculation control parameters may not vary operation during a regeneration cycle. The exhaust gas recirculation control parameters may reduce the amount of exhaust gas recirculation during a regeneration cycle. The amount of exhaust gas recirculation may be any amount that allows the temperature of the particulate filter to be controlled so that the particulate filter is not damaged. Preferably, exhaust gas recirculation may be completely stopped during a regeneration cycle. The exhaust gas recirculation may be controlled using standard control parameters during normal engine speed. The exhaust gas recirculation may be controlled using regeneration cycle parameters during a regeneration cycle when the engine speed is reduced to an idle. Preferably, the exhaust gas recirculation may be greatly reduced during a regeneration cycle where the engine speed is reduced to an idle. For example, the exhaust gas recirculation flow may be reduced to about 30 percent or less, preferably about 20 percent or less, or more preferably about 10 percent or less flow than that of standard operating parameters. More preferably, the exhaust gas recirculation may be substantially stopped during a regeneration cycle when the engine speed is reduced to an idle.

The computer may control the amount of fuel that is added to the exhaust system so that a regeneration cycle is initiated. The computer may also eliminate and/or reduce the amount of fuel added to the exhaust system if the engine speed is reduced to an idle so that the inlet gas temperature, the outlet gas temperature, or both is reduced so that the particulate filter is not damaged. The recirculation cycle duration may be shortened by the reduction and/or elimination of fuel into the exhaust system. The oxidation reaction during the regeneration cycle may end after the amount of fuel added to the exhaust system is reduce and/or eliminated. The throttle valve may be opened at any time so that the particulate filter is not damaged. The throttle valve may be closed and/or the opening reduced after a duration of time once a drop to idle during a regeneration cycle has occurred. For example, after the throttle valve has been maintained/opened by the computer the throttle valve may subsequently be closed after about 5 minutes or less, about 4 minutes or less, preferably about 3 minutes or less, or more preferably about 2 minutes or less. The throttle valve may be closed after between about 1 minute to about 2 minutes. The throttle valve opening may be closed and the exhaust gas recirculation opened after a pre-set amount of time. The pre-set amount of time may be any amount of time that prevents the particulate filter from being damaged. The pre-set amount of time may be calculated based upon tests performed. The pre-set amount of time may vary based on material properties of the filter. For example a Cordierite filter may have the throttle valve maintained open for 3 minutes whereas an Acicular Mullite filter may be maintained open for 2 minutes. The throttle valve may be closed and the exhaust gas recirculation opened once the outlet temperature reaches a preset temperature. For example, the throttle valve may be maintained in the open position until the outlet temperature reaches 700° C. and then the computer will begin closing the throttle valve and open the exhaust gas recirculation.

The computer may monitor the amount of air that flows through the particulate filter. The computer may measure the volume of air that travels through the particulate filter in a given amount of time (e.g., $m^3/min$ or $m^3/hr$). The volume of air that passes through the particulate filter may be any volume that is sufficient to keep the temperature of the filter low enough so that the filter is not damaged. The computer may control the amount of air that travels through the filter based upon the space velocity of the air through the particulate filter. The space velocity of a particulate filter may be calculated by taking the volumetric flow through the filter and dividing it by the volume of the filter. The amount of space velocity, during a drop to idle, though the filter may be about 15,000/hr or greater, preferably about 20,000/hr or greater, or more preferably about 25,000/hr or greater. The space velocity, during a drop to idle, through the filter may be about 50,000/hr or less, preferably about 40,000/hr or less, or more preferably about 35,000/hr or less (i.e. between about 21,000/hr and about 31,000/hr). The length of the filter may affect the space velocity. For example, if a higher space velocity is desired a shorter filter may be employed or if a lower space velocity is desired a longer filter may be employed.

The particulate filter may use a filter that is about 50 cm or shorter, about 40 cm or shorter, preferably about 30 cm or shorter, more preferably about 25 cm or shorter, or even more preferably about 20 cm or shorter. The length of the particulate filter may vary based upon the diameter of the particulate filter. For example, a longer particulate filter may have a smaller diameter, a shorter particulate filter may have a larger diameter, or a combination thereof. The particulate filter may have a diameter of about 40 cm or less, preferably about 30 cm or less, or more preferably about 25 cm or less.

The filter may have a volume in liters. The volume of the filer may be large enough so that the filter adequately removes contaminants from the exhaust stream and is not damaged when the engine drops to idle. The volume of the filter may be about 0.5 L or greater, about 1.0 L or greater, about 5 L or greater, or even about 10 L or greater. The volume of the filter may have a volume of about 100 L or smaller, about 75 L or smaller, about 60 L or smaller, about 50 L or smaller, or about 40 L or smaller.

The volume of the filter may have a ratio to the size of the engine. The ratio of filter size to engine size may be any ratio that does not damage the filter when the engine drops to idle. The ratio of the filter size to engine size may be any ratio that adequately removes contaminates from the exhaust stream. The ratio of filter size (e.g., in liters) to the size of the engine (e.g., volumetric engine displacement in liters) may be about 2:1 or less, about 1.8 or less, preferably about 1.5 or less, more preferably about 1.2 or less, most preferably, about 1.1 or less.

The outlet gas temperature may be any temperature that is sufficiently low so that the particulate filter is not damaged. The maximum gas outlet temperature may vary depending on the material of the particulate filter. The peak outlet gas temperature may be maintained below about 1000° C. Preferably, the peak outlet gas temperature may be maintained below about 900° C. More preferably, the peak outlet gas temperature may be maintained below about 850° C. Most preferably, the peak outlet gas temperature may be maintained below about 800° C. The present invention may sufficiently reduce the peak outlet gas temperature when the engine speed drops to idle during a regeneration cycle so that the filter is not damaged. The present invention may reduce the peak outlet gas temperature by about 150° C. or more, by about 175° C. or more, preferably by about 200° C. or more, or more preferably by about 250° C. or more, or most preferably by about 300° C. or more.

The exhaust mass flow through the exhaust system may be controlled. The amount of exhaust mass flow through the system may be any amount that allows the peak outlet temperature to be low enough so that the particulate filter is not damaged. The amount of exhaust mass flow through the filter may be about 0.5 Kg/min or higher, preferably about 1.0 Kg/min or higher, more preferably about 2.0 Kg/min or higher, or most preferably about 3.0 Kg/min or higher. The exhaust mass flow rates discussed herein may be converted to a space velocity so that a space velocity may be defined for all filters discussed and described herein regardless of length, diameter, cross sectional area, or a combination thereof. For example, a mass flow rate of 0.5 kg/min has a space velocity of about 4,784/hr for a 5.2 L filter, and a mass flow rate of 3.0 kg/min has a space velocity of about 24,922/hr for a 6 L.

The exhaust system may be free of an oxygen sensor. The signal from the oxygen sensor may not be used to control the speed of the engine (e.g. revolutions per minute (RPM)), the volume of exhaust that flows through the particulate filter, the rate of exhaust flow through the particulate filter, or a combination thereof. The temperature of the particulate filter may be controlled independently of increasing the RPMs of the engine. The amount of air moved through the particulate filter may be increased without increasing the RPMs of the engine. The concentration and/or mass flow rate of oxygen may not be used to control the temperature of the particulate filter during a regeneration cycle. The temperature of the regeneration cycle may be controlled independent of the oxygen concentration, oxygen mass flow rate, or both. The temperature of the particulate filter may not be controlled by reducing the oxygen concentration flowing into the particulate filter. The amount (e.g. concentration and mass) of fresh air (i.e., oxygen) added into the system may be increased so that the particulate filter is not damaged.

FIG. 1 illustrates one possible configuration of the present invention. The exhaust system 2 is in communication with an engine 4 via an exhaust pipe 6 that extends between the engine 4 and the exhaust system 2. The exhaust system 2 includes a turbo charger 8 a diesel oxidation catalyst 10, a diesel particulate filter 12, and a selective catalyst reduction 14. The diesel particulate filter 12 has an inlet side 16 and an outlet side 18. The inlet side 16 of the diesel particulate filter 12 includes a temperature sensor 20 and a pressure sensor 22. The outlet side 18 of the diesel particulate filter 12 includes a temperature sensor 24 and a pressure sensor 26. The diesel particulate filter 12 includes a diameter (D) and a length (L). The inlet temperature sensor 20, outlet temperature sensor 24, inlet pressure sensor 22, and outlet pressure sensor 24 are in communication with the control module 28 and continuously or intermittently send temperature and/or pressure readings to the control module 28. The control module 28 and the diesel particulate filter 12 are in communication so that during a regeneration cycle the control module 28 may control the temperature of the diesel particulate filter and/or the temperature of the gas 30 leaving the exhaust system 2.

Figure 2:
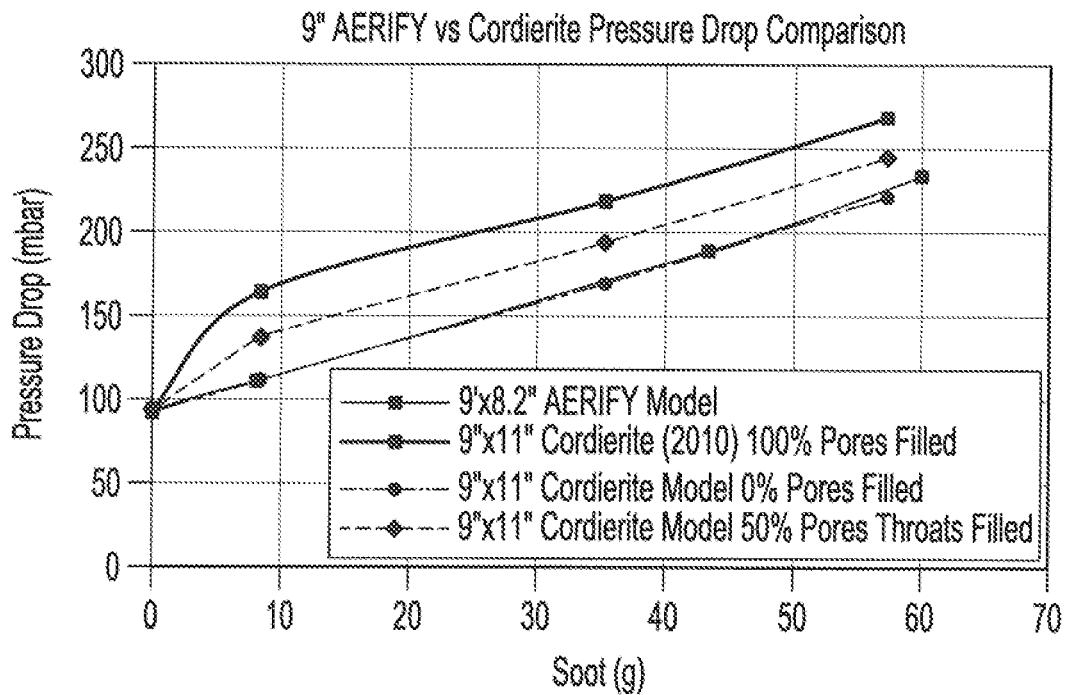
FIG. 2 illustrates one possible pressure drop look-up table.

FIG. 2 illustrates a possible pressure drop look-up table that correlates pressure drop to the amount of soot loaded in the diesel particulate filter. FIG. 2 includes possible graphic configurations for both Acicular Mullite and Cordierite diesel particulate filters. The Acicular Mullite diesel particulate filter exhibits a substantially liner data plot. The Cordierite graph also exhibits a substantially linear data plot at 0 percent full, 50 percent full, and 100 percent full. The Cordierite date plot may have an initial non-linear loading region from the data plots that represent the diesel particulate filter being 50 percent full and 100 percent full. The graph also shows that a smaller Acicular Mullite diesel particulate filter exhibits higher soot loading characteristics with a lower pressure drop than the Cordierite diesel particulate filters.

Figure 3:
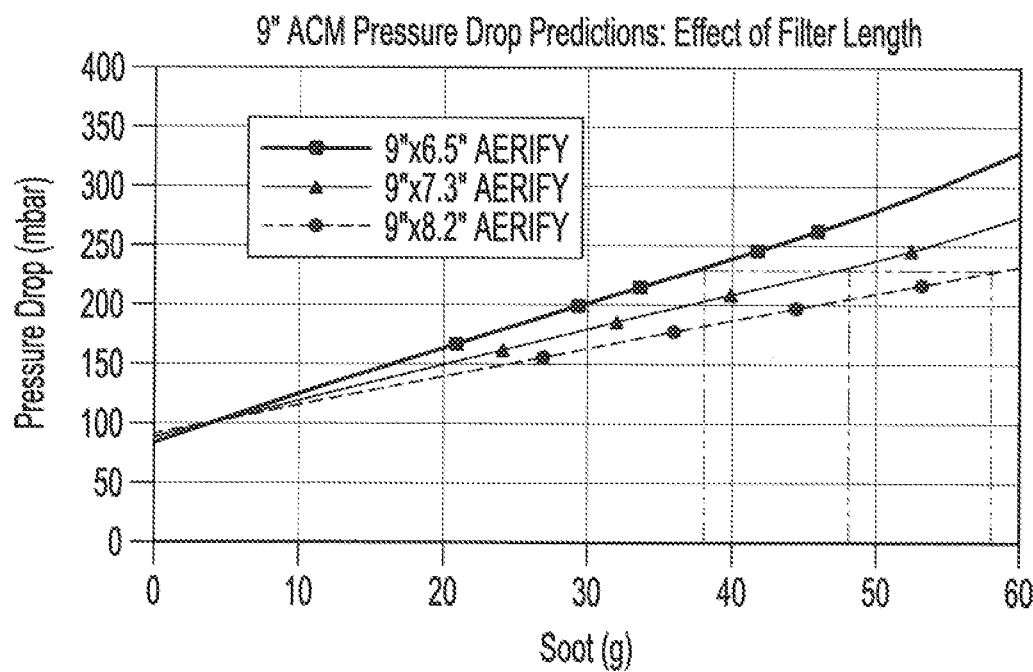
FIG. 3 illustrates another possible pressure drop look-up table.

FIG. 3 illustrates that reducing the length of the diesel particulate filter reduces that maximum soot loading of the diesel particulate filter. FIG. 3 also illustrates that the length of the diesel particulate filter does not affect the shape of the data plot of the Acicular Mullite diesel particulate filters. FIG. 3 further illustrates that as the change in pressure drop increases the amount of soot contained in the diesel particulate filter proportionally increases. For example, at a pressure drop of 22.5 kPa (e.g. about 225 mbar) a 20.8 cm (e.g. about 8.2 inch) filter may hold about 58 grams; a 18.5 cm (e.g. about 7.3 inch filter) may hold about 48 grams; and a 16.5 cm (e.g. about 6.5 inch) filter may hold about 38 grams of soot. It is contemplated that by decreasing the length and maximum soot loading capabilities of the diesel particulate filter the frequency of the regeneration cycles may not be increased. FIG. 3 may be used to design a system where the size of the filter is fitted to the system so that regeneration efficiency is maximized, the size of the filter is minimized, soot operating capacity is maximized, or a combination thereof. The pressure drop look-up table in FIGS. 2 and 3 are used to calculate the amount of pressure drop in the diesel particulate filter to trigger a regeneration cycle at a maximum soot load. For example, an 8.2 in Aerify filter in FIG. 3 creates an initial pressure drop of about 95 mbar and at a target soot mass load of about 58 grams creates a pressure drop of about 220 mbar. In this example once the pressure drop reaches 220 mbar or a change in pressure drop of about 125 mbar a regeneration cycle is triggered.

Figure 4A:
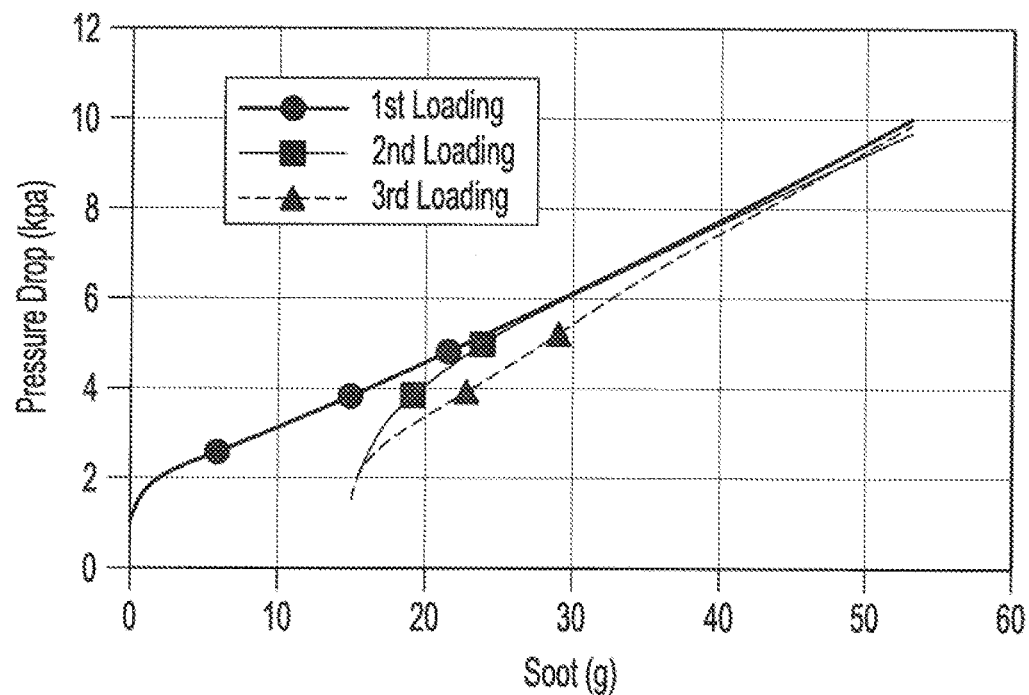
FIGS. 4A and 4B illustrate examples of possible loading characteristics of a diesel particulate filter being regenerated at different soot loadings.
Figure 4B:
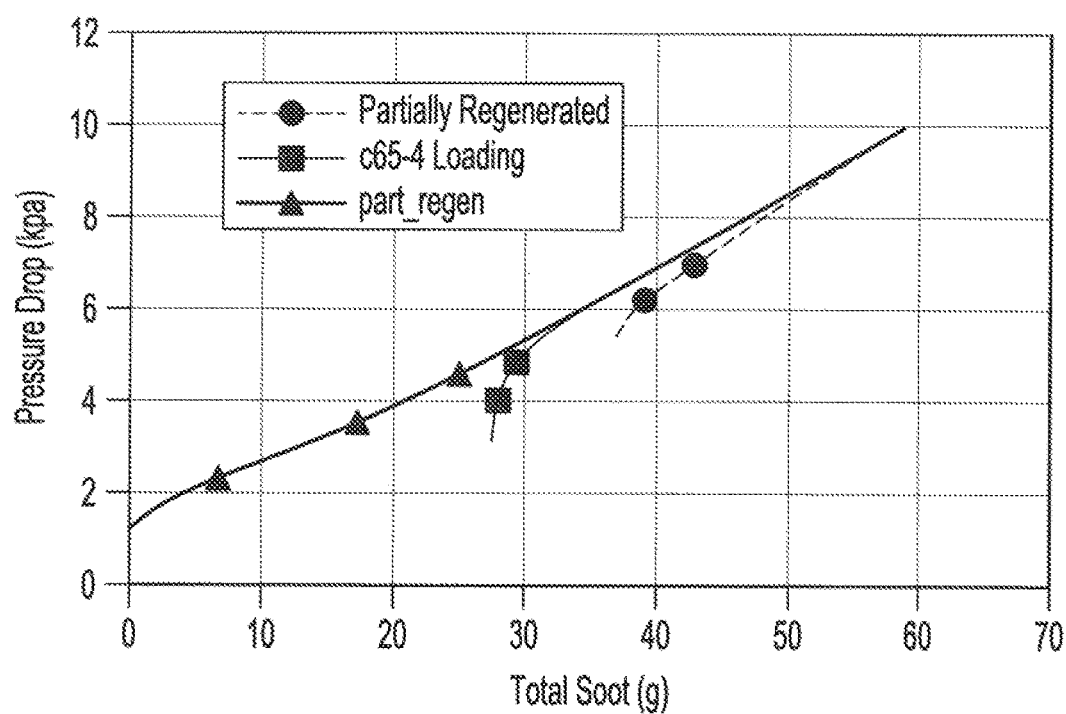

FIGS. 4A and 4B illustrate examples of the loading characteristics of a new filter, the filter after one regeneration cycle, and the filter after two regeneration cycles. As can be seen in FIG. 4A the first loading of an Acicular Mullite diesel particulate filter exhibits a substantially linear data plot. Once the filter is regenerated, the diesel particulate filter is loaded a second time with soot, and during the second loading of the the diesel particulate filter the data plot shows an initial ramp up and then a substantially linear data plot. The data plot of the second loading of the diesel particulate filter substantially aligns with the data plot from the first loading of the diesel particulate filter. This type of data plot can then be seen again in the third loading after a second regeneration cycle is completed. The linear characteristics of the data plot enable an accurate calculation of the soot load to be performed so that during a regeneration cycle the temperature of the diesel particulate filter can be maximized and the risk of a "runaway" reaction can be minimized. As can be seen in FIG. 4B the data plot of a partially regenerated diesel particulate filter (i.e., the regeneration cycle does not remove 100 percent of the soot from the filter) exhibits similar characteristics to that of the new diesel particulate filter of FIGS. 4A-4B. As can be seen the partially regenerated data plot in FIG. 4B exhibits the same ramp up feature before becoming substantially linear. All of the data plots in FIGS. 4A and 4B exhibit substantially no hysteresis when new, fully regenerated, partially regenerated, or a combination thereof. If can further be seen that the data plots in FIGS. 4A and 4B that when the soot loads are in the range of about 30 grams to about 60 grams the data plots exhibit no hysteresis such that the predictability of the calculated soot load and the actual soot load becomes substantially similar.

Figure 5A:
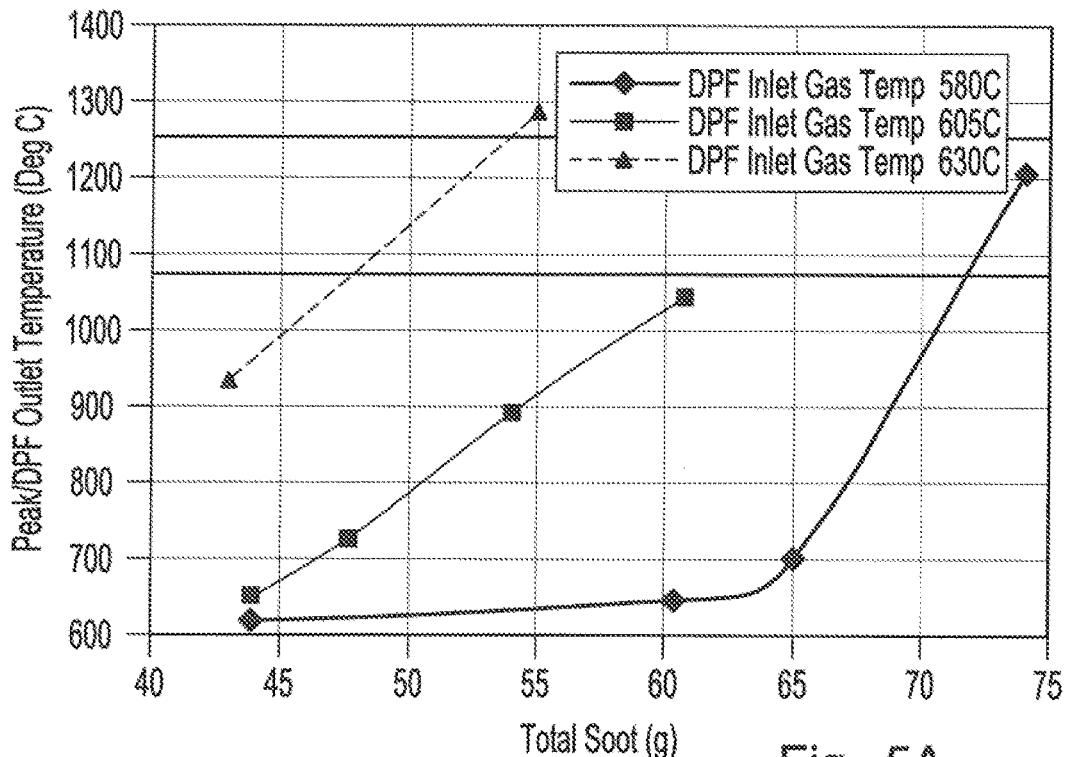
FIGS. 5A and 5B illustrate examples of inlet gas temperature look-up tables.
Figure 5B:
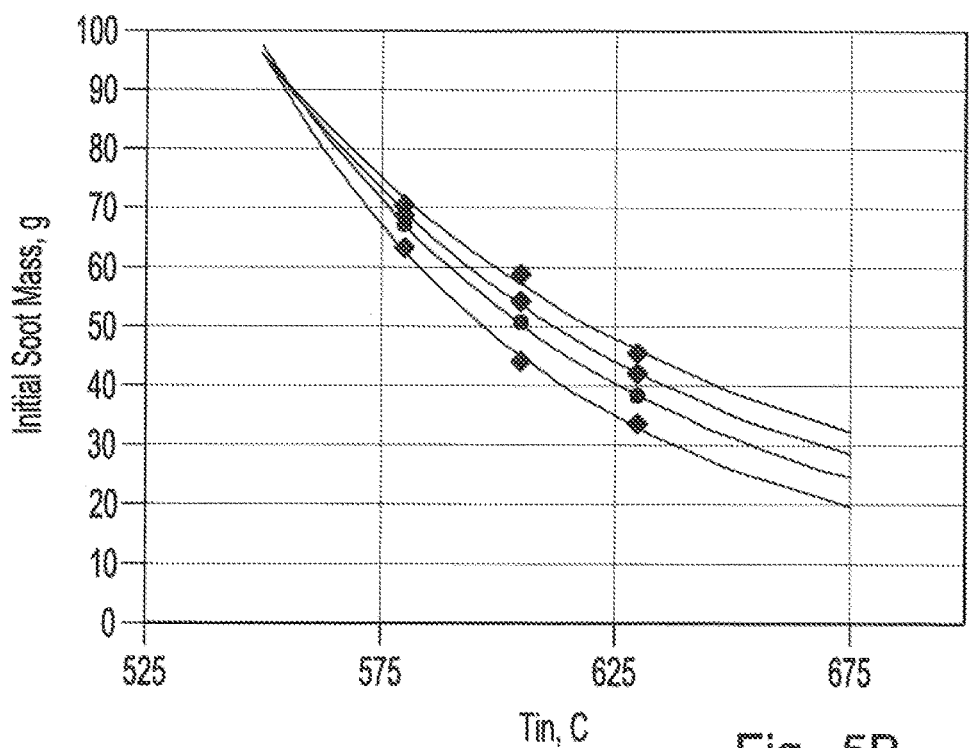
Figure 6:
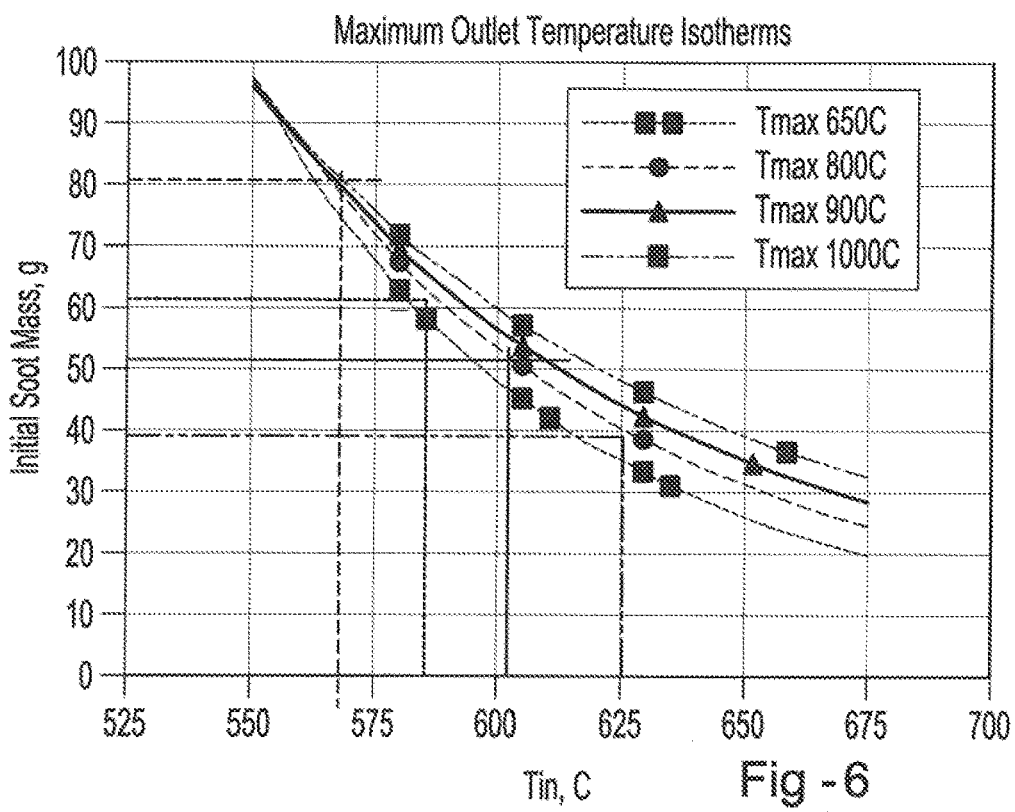
FIG. 6 illustrates one example of a inlet gas temperature look-up table.
Figure 7:
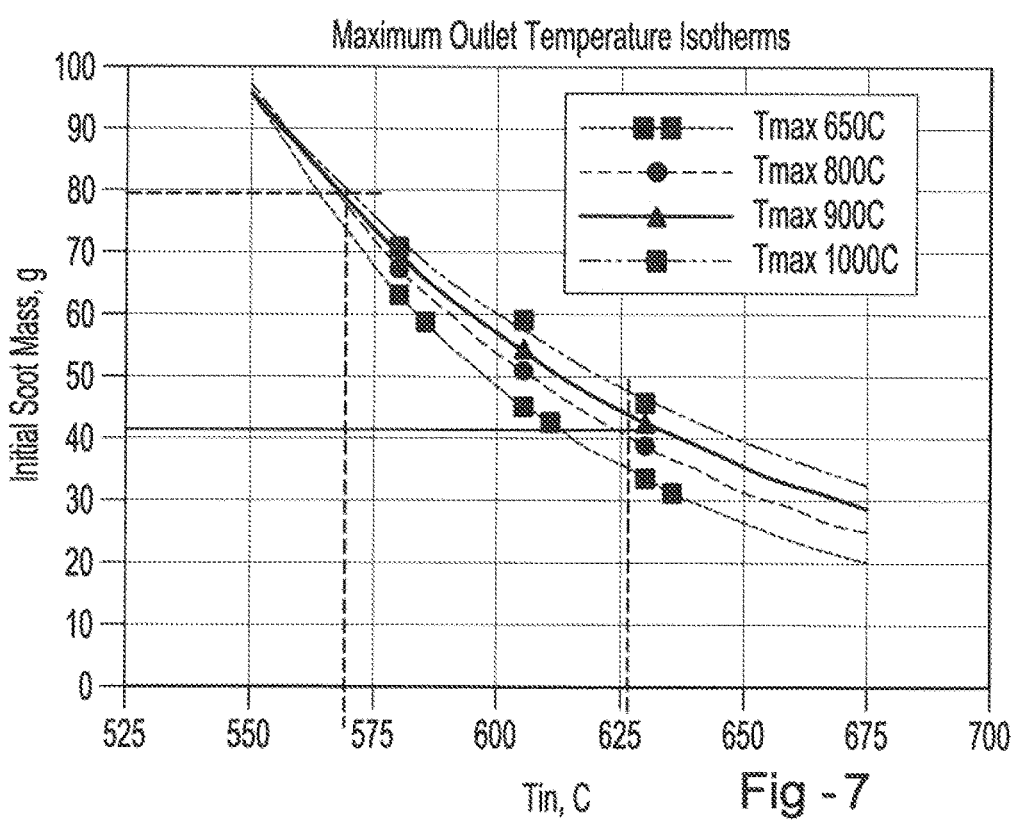
FIG. 7 illustrates another example of a inlet gas temperature look-up table.

FIGS. 5A and 5B show examples of different inlet gas temperature look-up tables and the correlation between the inlet gas temperature and the peak outlet temperature depending on the amount of soot in the diesel particulate filter. As illustrated in FIG. 5A increasing the soot load at a given inlet gas temperature drastically increases the peak outlet temperature. For example, at a soot load of about 47 grams and an inlet gas temperature of about 605° C. the resulting peak outlet temperature is about 720° C.; and at a soot load of about 50 grams and an inlet gas temperature of about 605° C. the resulting peak outlet temperature is about 800° C. In this example if the calculation was not accurate and resulted in an additional three grams of soot the peak outlet temperature would increase by about 80° C. resulting in the peak outlet temperature approaching a temperature where the diesel particulate filter may be damaged. Therefore, by being able to more accurately calculate the soot load for a given inlet gas temperature the peak outlet temperature can be controlled so that the filter is not damaged by a runaway reaction. FIG. 5B is an example of the data may be arranged to form a different graph than the one illustrated in FIG. 5A. FIG. 5B illustrates some examples of peak outlet temperatures (e.g. maximum temperature filter bed isotherms) that may be graphically illustrated which correlate soot loading to inlet gas temperatures. FIGS. 6 and 7 coupled with tables 1 through 4 illustrate examples of how soot loading and inlet gas temperature (i.e. FIG. 5B) may be manipulated so that the diesel particulate filter does not exceed the peak outlet temperature.

FIG. 6 illustrates one example of the interplay between soot load, inlet gas temperature, and the peak outlet temperature (i.e. maximum temperature filter bed isotherm). The graph in FIG. 6 is one example of a inlet gas temperature look-up table that may be loaded into the control module, and how the look-up table may be used. An inlet gas temperature may be selected that will not exceed a peak outlet temperature based upon a maximum soot load that is calculated from the target soot load plus the soot mass predictability. FIG. 6 and Table 1 illustrate the results of calculating the maximum inlet gas temperature that can be used without the risk of damaging the diesel particulate filter. The maximum soot load for a given filter must first be determined using the target soot mass load and the loading predictability of the diesel particulate filter. In Table 1 the 9×11 in Cordierite filter has a maximum soot load of 80 grams and the 9×7.3 in Acicular Mullite filter has a maximum soot load of 52 grams. Table 1 shows that the Cordierite filter has a soot mass predictability of about ±2.0 g/L and the Acicular Mullite filter has a soot mass predictability of about ±0.5 g/L, which is then used to calculate the maximum soot mass load that can used with FIG. 6 to determine the inlet gas temperature.

TABLE 1

Maximum inlet gas temperature for regeneration 7.3" vs. 11" length

| Target Size | Material | Target soot mass | Soot mass predictability | Maximum soot mass | Inlet gas Temperature |
|---|---|---|---|---|---|
| 9 × 11 in | Cordierite | 58 g | ±2.0 g/L | 80 g | 565° C. |
| 9 × 8.2 in | Acicular Mullite | 58 g | ±0.5 g/L | 68 g | 585° C. |
| 9 × 7.3 in | Acicular Mullite | 48 g | ±0.5 g/L | 52 g | 600° C. | duration. For the first example, the Cordierite filter has a target soot load of 58 grams will be used and the target inlet gas temperature is 565° C. used. The regeneration cycle will continue until the slope of the curve begins to plateau. The plateau for the 565° C. curve occurs at about 15 grams of soot. Thus, the duration of the regeneration cycle will be about 38 minutes and will remove about 43 grams of soot for a regeneration efficiency of about 75 percent as indicated in Table 2. For example, an Acicular Mullite filter that is about 9 in×8.2 has a target of about 58 grams and the calculated target inlet gas temperature of about 585° C. will be used. Again, the regeneration cycle will continue until the duration reaches the plateau in the data plot curve. The plateau in the 585° C. curve occurs at about 15 grams of soot remaining in the filter with a duration of about 23 minutes resulting in about a 75 percent regeneration cycle efficiency as indicated in Table 2. Thus, the same efficiency may be achieve with a smaller filter so that less packaging space is required.

In another example the Acicular Mullite filter has a target of about 48 grams and the calculated target inlet gas temperature of about 600° C. will be used. Again, the regeneration cycle will continue until the duration reaches the plateau in the data plot curve. The plateau in the 600° C. curve occurs at about 5 grams of soot remaining in the filter with a duration of about 23 minutes resulting in about a 90 percent regeneration cycle efficiency as indicated in Table 2.

TABLE 2

Regeneration benefit Comparison longer v. shorter filter

| Diesel Particulate Filter Type | Target soot mass | Regeneration efficiency | Operating soot mass | Regeneration Temp. | Total No. of Regenerations | Regeneration Duration | Total time spent in Regeneration |
|---|---|---|---|---|---|---|---|
| Cordierite 9 × 11 in | 58 g | 75 | 43 g | 565° C. | 685 | 38 min | 434 hr |
| ACM 9 × 8.2 in | 58 g | 75 | 43 g | 585° C. | 685 | 23 min | 263 hr |
| ACM 9 × 7.3 in | 48 g | 90 | 43 g | 600° C. | 685 | 23 min | 263 hr |

Once the maximum soot mass load is determined a maximum outlet temperature that will not damage the filter is determined. In the example of FIG. 6 the curve representing 800° C. was used as the maximum outlet temperature. Thus, FIG. 6 shows that given a maximum soot mass of 80 grams and a maximum outlet temperature of 800° C. the Cordierite filter should not have an inlet gas temperature of more than about 565° C., and the Acicular Mullite filter having a maximum soot mass of about 52 g and a maximum outlet temperature of 800° C. the inlet gas temperature should not exceed 600° C.

Figure 8:
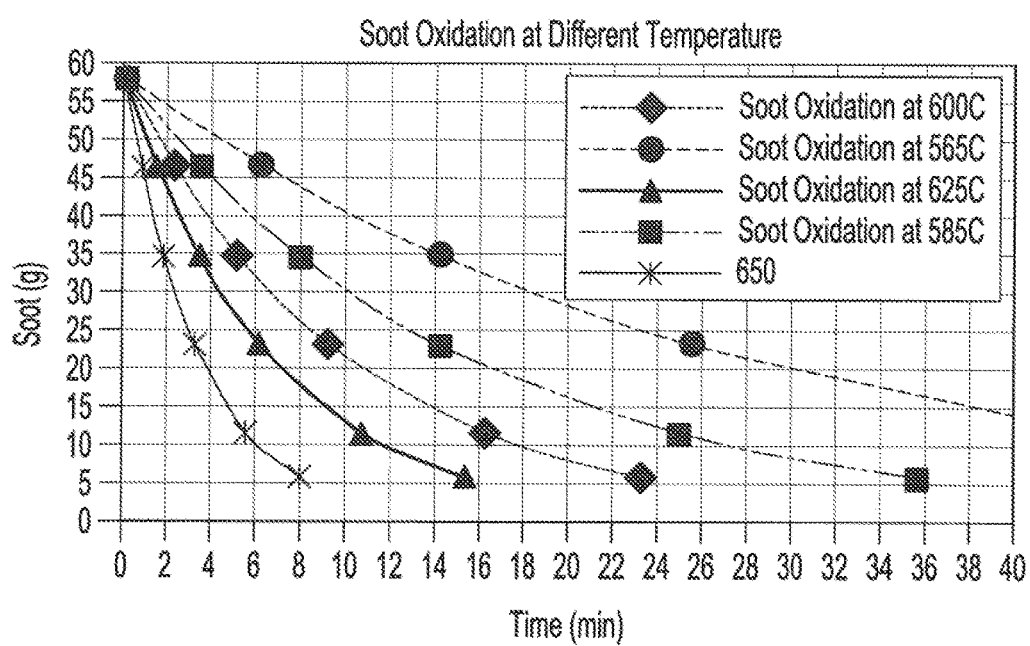
FIG. 8 illustrates one example of a duration look-up table.

FIG. 8 may next be used to determine the duration of each regeneration and the regeneration efficiency for a given FIG. 7 illustrates another possible inlet gas temperature look-up table. In Table 1 the 9×11 in Cordierite filter has a maximum soot load of 80 grams and the 9×6.5 in Acicular Mullite filter has a maximum soot load of 41 grams. The soot mass predictability of each filter must next be obtained. Table 3 shows that the Cordierite filter has a soot mass predictability of about ±2.0 g/L and the Acicular Mullite filter has a soot mass predictability of about ±0.5 g/L, which is then used to calculate the maximum soot mass load that can be inputted into FIG. 7.

TABLE 3

Maximum inlet gas temperature for regeneration 6.5" vs. 11" length

| Target Size | Material | Target soot mass | Soot mass predictability | Maximum soot mass | Inlet gas Temperature |
|---|---|---|---|---|---|
| 9 × 11 in | Cordierite | 58 g | ±2.0 g/L | 80 g | 565° C. |
| 9 × 6.5 in | Acicular Mullite | 38 g | ±0.5 g/L | 41 g | 625° C. |

Once the maximum soot mass load is determined a maximum outlet temperature that will not damage the filter is determined. In the example of FIG. 7 the curve representing 800° C. was used as the maximum outlet temperature. Thus, FIG. 7 shows that given a maximum soot mass of 80 grams and a maximum outlet temperature of 800° C. the Cordierite filter should not have an inlet gas temperature of more than about 565° C., and the Acicular Mullite filter having a maximum soot mass of about 41 g and a maximum outlet temperature of 800° C. the inlet gas temperature should not exceed 625° C.

FIG. 8 may next be used to determine the duration of each regeneration and the to regeneration efficiency for a given duration. For the first example the Cordierite filter has a target soot load of 58 grams and the target inlet gas temperature is 565° C. used. The regeneration cycle will continue until the slope of the curve begins to plateau. The plateau for the 565° C. curve occurs at about 15 grams of soot. Thus, the duration of the regeneration cycle will be about 38 minutes and will remove about 43 grams of soot for a regeneration efficiency of about 75 percent as indicated in Table 4. For the other example the Acicular Mullite filter has a target of about 38 grams and the calculated target inlet gas temperature is about 625° C. Again, the regeneration cycle will continue until the duration reaches the plateau in the data plot curve. The plateau in the 625° C. curve occurs at about 4 grams of soot remaining in the filter with a duration of about 16 minutes resulting in about a 90 percent regeneration cycle efficiency as indicated in Table 2.

the regeneration efficiency may be improved to about 91 percent. In stepping the inlet gas temperature the regeneration efficiency and the regeneration duration can be reduced.

Figure 9:
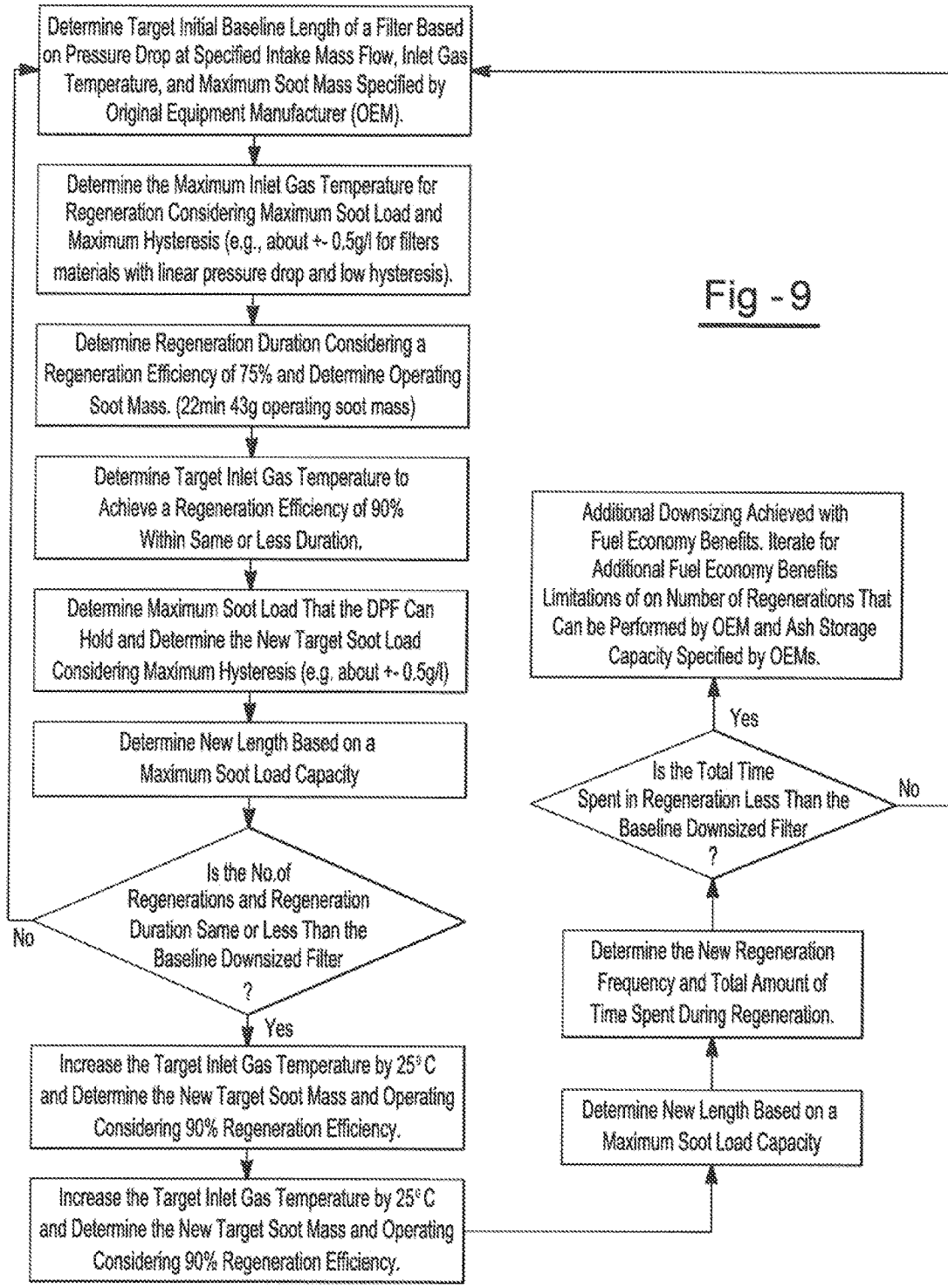
FIG. 9 illustrates a process flow diagram illustrating one possible method for calculating a downsized particulate filter.

Example 1 is one method that may use the process steps set forth in FIG. 9 using the look-up tables illustrated in FIGS. 1-8. A baseline filter length is calculated using the parameters specified by the Original Equipment Manufacturer (OEM). The baseline filter length is determined using the pressure drop look-up tables illustrated in FIGS. 1 and 2. The pressure drop at a specified intake mass flow, inlet gas temperature, and maximum soot mass is used to determine the size of the baseline filter. In example 1, the baseline length for the diesel particulate filter is 8.2 inches long with a diameter of 9 in.

The maximum inlet gas temperature for a regeneration cycle is calculated using the calculated maximum soot load and maximum outlet gas temperature illustrated in FIGS. 4A-7. The maximum soot load is calculated using the target soot load and the maximum hysteresis for the filter. In example 1, the maximum hysteresis for the diesel particulate filter is ±0.5 g/L which results in a maximum soot mass of 68 g as illustrated in Table 1. FIG. 6 illustrates that with a maximum soot mass of 68 g and a maximum outlet temperature of 800° C. the inlet gas temperature is 585° C.

The regeneration duration is calculated using the duration look-up table and a regeneration efficiency of 75 percent. The regeneration duration is 22 minutes at 585° C. as is illustrated in Table 1. The operating soot mass load is calculated using a duration of 22 minutes and the duration look-up table illustrated in FIG. 8. The operating soot mass load is 43 g for the 9 in×8.2 in filter. The target regeneration efficiency is increased from 75 percent to 90 percent for the same or less duration calculated in the previous step and a new inlet gas temperature is determined. The duration look-up table illustrated in FIG. 8 is used to calculate the new inlet gas temperature of 600° C.

The maximum soot load of the diesel particulate filter is determined using the inlet gas temperature look up table illustrated in FIG. 6 for the new inlet gas temperature of 600°

TABLE 4

Regeneration benefit Comparison longer v. shorter filter

| Diesel Particulate Filter Type | Target soot mass | Regeneration efficiency | Operating soot mass | Regeneration Temp. | Total No. of Regenerations | Regenerations Duration | Total time spent in Regeneration |
|---|---|---|---|---|---|---|---|
| Corderite (9 × 11 in) | 58 g | 75 | 43 g | 565° C. | 685 | 38 min | 434 hr |
| ACM 9 × 6.5 in | 38 g | 90 | 34 g | 625° C. | 866 | 16 min | 231 hr |

FIG. 8 may also be used to calculate the duration of a regeneration cycle when a step in gas inlet temperature is performed. For example, if the target soot mass load is 60 grams and the inlet gas temperature is 575° C. and the regeneration cycle has progressed for 6 minutes the current soot load would be about 47 g. The gas inlet temperature may then be increased to 600° C. and if this progress for 5 minutes (i.e. a total duration of 11 minutes) the current soot load would be about 33 grams. The gas inlet temperature may then be increased a second time to about 625° C. for about 11 minutes (i.e. a total duration of about 22 minutes) before the regeneration cycle is terminated resulting in a final soot mass load of about 5 grams. If the duration for a stepped regeneration is compared to a non-stepped regeneration the total duration can be reduced by 16 minutes and C. A new target soot load is calculated based upon the calculated maximum soot load and the maximum hysteresis provided for the diesel particulate filter. The new target soot load for example 1 is calculated to be 48 grams. A new length of the diesel particulate filer is calculated for the target soot load using the pressure drop look-up table in FIG. 3. The new target filter length is calculated using the pressure drop look-up table of FIG. 3 and the new calculated length is 7.3 in with a diameter of 9 in. The number of regenerations and the duration of the regeneration cycles is compared to the baseline downsized filter. If the number of regenerations and regeneration duration is the same or less than the baseline downsized filter then the downsizing is successful. If the number of regenerations and regenerations duration is not the same or less then the process is repeated until they are the same or less.

Fuel consumption is improved by further process steps. The target inlet gas temperature is increased for the new target diesel particulate filter length. The target inlet gas temperature is increased by 25° C. and the inlet gas temperature look-up table illustrated in FIG. 6 is used to calculate the new target soot mass of 38 g. The operating soot mass is then calculated the duration look-up table illustrated in FIG. 8 and a regeneration efficiency of 90 percent. The resulting operating mass is 34 g for the new inlet gas temperature. The maximum soot load capacity is calculated using the maximum hysteresis provided, which results in a maximum soot load capacity of 38 g. The new length of the diesel particulate filter is calculated using the maximum soot load capacity, the target pressure drop, and the pressure drop look up table illustrated in FIG. 3.

The regeneration frequency for the length of the diesel particulate filter and the operating soot load is determined. The duration look-up table illustrated in FIG. 8 is used to calculate the duration of each regeneration cycle for the calculated diesel particulate filter. As illustrated in Table 4 the calculated new size (9×6.5 in) of the diesel particulate filter results in a total regeneration time of 231 hours versus the initial baseline length (9×11 in) that has a total regeneration time of 434 hours. The steps are repeated until the minimum ash storage capacity, maximum regeneration cycle frequency, or both are achieved.

Figure 11:
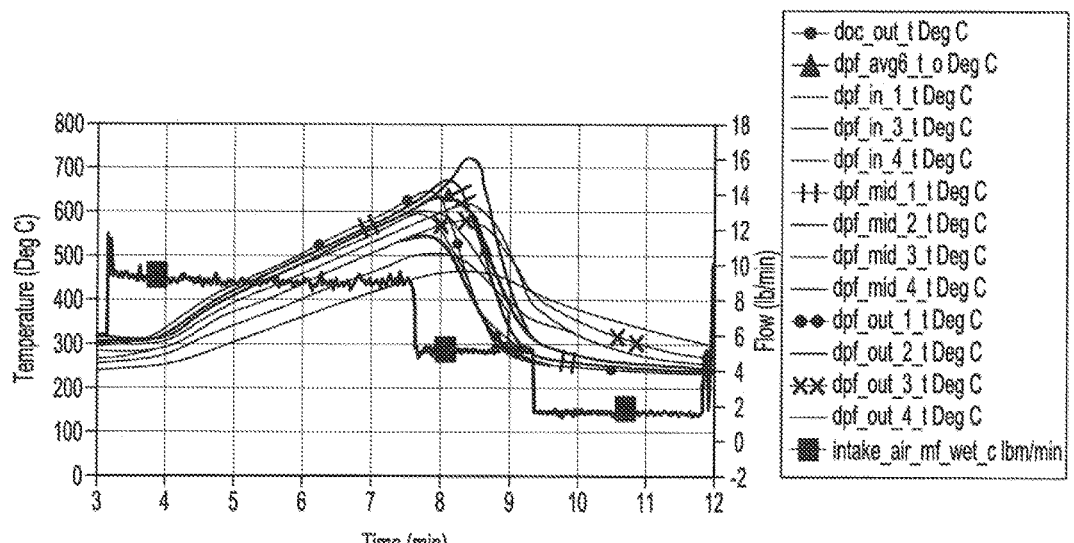
FIG. 11 illustrates the peak outlet temperature of a 7.2 inch filter when the mass flow rate is reduced from 9 lbs/min to 5 lbs/min during a drop to idle when the inlet gas temperature is 630° C.
Figure 12:
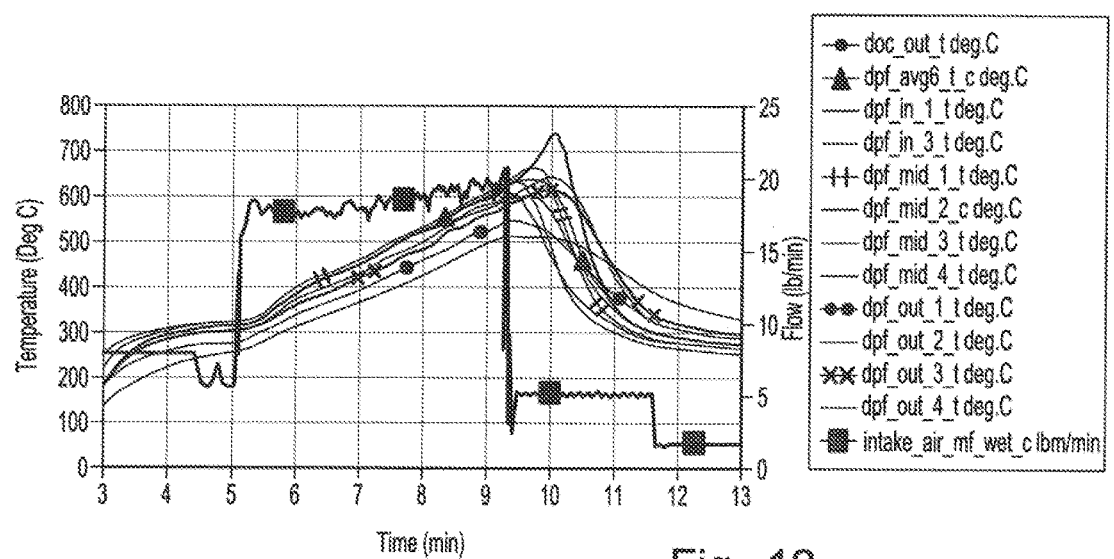
FIG. 12 illustrates the peak outlet temperature of a 7.2 inch filter when the mass flow rate is reduced 19 lbs/min to 5 lbs/min during a drop to idle when the inlet gas temperature is 630° C.
Figure 13:
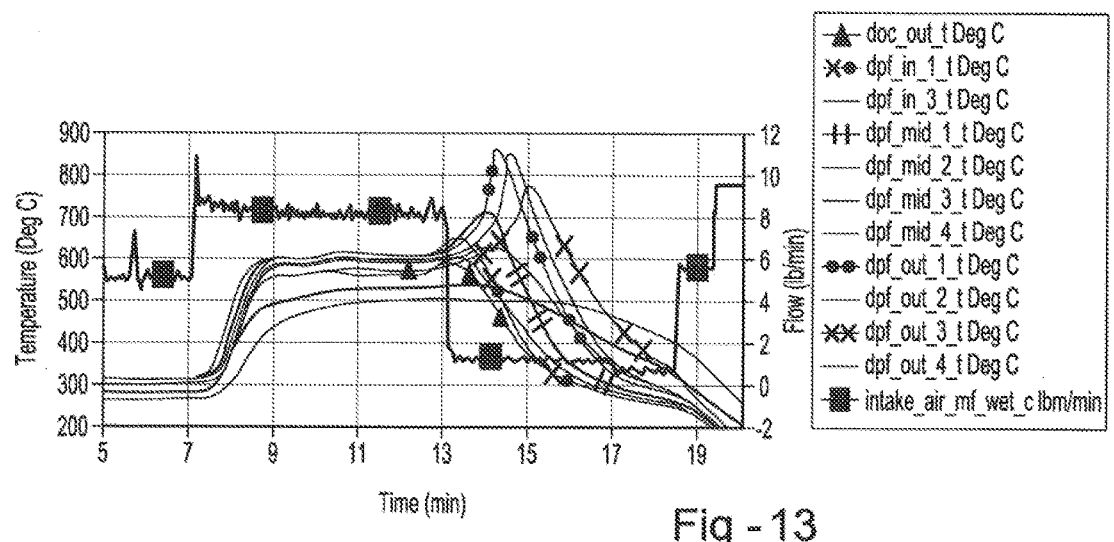
FIG. 13 illustrates the peak outlet temperature of a 7.2 inch filter when the mass flow rate is reduced from 8 lbs/min to 2 lbs/min during a drop to idle when the inlet gas temperature is 630° C. and reduced to 575° C. and maintained before the drop to idle.
Figure 14:
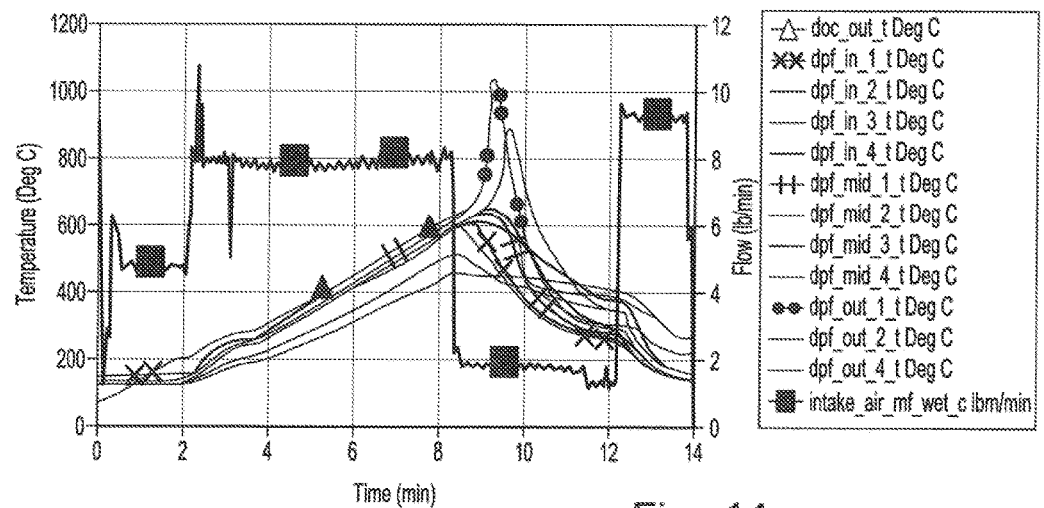
FIG. 14 illustrates the peak outlet temperature of a 6 inch filter when the mass flow rate is reduced from 8 lbs/min to 2 lbs/min during a drop to idle when the inlet gas temperature is 625° C.

The following examples as represented in FIGS. 10-15 and described herein measure temperature of the diesel particulate filter in 12 locations. Four sensors are in the inlet side of the diesel particulate filter, four in the center region of the diesel particulate filter, and four in the outlet region of the diesel particulate filter. The sensors are spaced apart in each region so that the temperature of the edges, the center, and the area between the edge and the center of the diesel particulate filter are measured. The volume of air passing through the diesel particulate filter is measured so that the affect of the volume of air passing through the diesel particulate filter on temperature during a drop to idle could is measured. FIGS. 10-13 illustrate examples of drops to idle during a regeneration cycle using a 7.2 inch diesel particulate filter and FIGS. 13-14 illustrate examples using a 6 inch diesel particulate filter.

Figure 10:
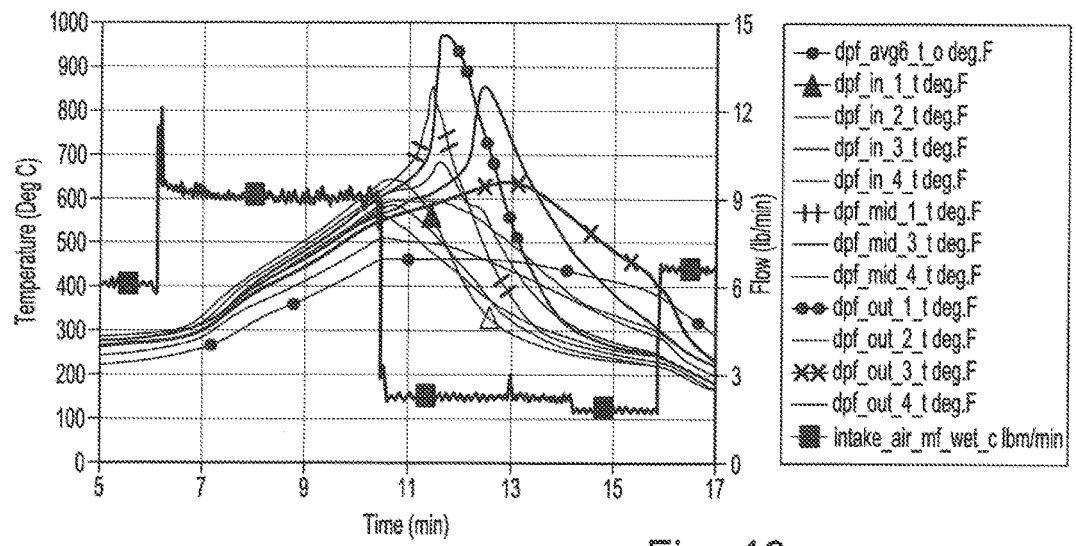
FIG. 10 illustrates the peak outlet temperature of a 7.2 inch filter when the mass flow rate is reduced from 8 lbs/min to 2 lbs/min during a drop to idle when the inlet gas temperature is 630° C.

Example 2 as illustrated in FIG. 10 is one example where no control is performed when the engine drops to idle during a regeneration cycle. During normal engine operation the volume of flow through the diesel particulate filter is about 9 lbs/min, and during a drop to idle the volume is reduced to about 2 lbs/min. The inlet gas temperature to the diesel particulate filter during normal operating procedure is about 225° C. to about 250° C. As can be seen in FIG. 9 a regeneration cycle is triggered after about 7 minutes and the inlet gas temperature and the outlet gas temperature increase. After about 3 min and 40 seconds (i.e., about 10 min and 40 seconds total time) the engine speed drops to idle and the peak outlet temperature increases in some locations on the outlet side of the diesel particulate filter to as high as 950° C., which may potentially damage the diesel particulate filter.

Example 3 as illustrated in FIG. 11 is one example implementing the teachings of the present invention dropping the engine to idle during a regeneration cycle. During normal engine operation the volume of flow through the diesel particulate filter is about 9 lbs/min, and during a drop to idle the flow is reduced to about 5 lbs/min because the throttle valve was opened and the exhaust gas recirculation was closed, instead of the normal flow at idle of about 2 lbs/min. The inlet gas temperature to the diesel particulate filter during normal operating procedure is about 250° C. to about 275° C. As can be seen in FIG. 11 a regeneration cycle is triggered after about 4 minutes and the inlet gas temperature and the outlet gas temperature increase. After about 3 min and 40 second (i.e., about 7 minutes and 40 seconds total time) the engine speed drops to idle and the peak outlet temperature increases in some locations of the outlet side of the diesel particulate filter to as high as 720° C. After about 2 minutes at the increased volume flow of about 5 lbs/min through the diesel particulate filter the throttle valve and the exhaust gas recirculation return to the normal volume of flow of about 2 lbs/min. Implementing the teachings of the present invention reduces the outlet gas temperature by about 230° C., which is below a temperature where the diesel particulate filter may be damaged.

Example 4 as illustrated in FIG. 12 is one example implementing the teachings of the present invention when the engine drops to idle during a regeneration cycle. During normal engine operation the volume of flow through the diesel particulate filter is about 19 lbs/min, and during a drop to idle the volume is reduced to about 5 lbs/min because the throttle valve is opened and the exhaust gas recirculation is closed, instead of the normal flow at idle of about 2 lbs/min. The inlet gas temperature to the diesel particulate filter during normal operating procedure is about 250° C. to about 275° C. As can be seen in FIG. 12 a regeneration cycle is triggered after about 5 minutes and the inlet gas temperature and the outlet gas temperature increase. After about 4 min and 20 seconds (i.e., about 9 minutes and 20 seconds total time) the engine speed drops to idle and the peak outlet temperature increases in some locations of the outlet side of the diesel particulate filter to as high as 740° C. Again, after about 2 minutes at the increased volume flow of about 5 lbs/min through the diesel particulate filter the throttle valve and the exhaust gas recirculation return to the normal idle control parameters and the volume of flow returns to about 2 lbs/min. Implementing the teachings of the present invention reduces the outlet gas temperature by about 210° C., which is below a temperature where the diesel particulate filter may be damaged.

Example 5 as illustrated in FIG. 13 is one example where no control was performed when the engine drops to idle during a regeneration cycle because the regeneration cycle has a duration of 5 minutes or greater. During normal engine operation the volume of flow through the diesel particulate filter is about 8 lbs/min, and during a drop to idle the volume of flow is reduced to about 2 lbs/min. The inlet gas temperature to the diesel particulate filter during normal operating procedure is about 300° C. As can be seen in FIG. 13 a regeneration cycle is triggered after about 8 minutes and the inlet gas temperature and the outlet gas temperature increases. The diesel particulate filter achieves a stead inlet gas temperature of about 575° C. for about 4 minutes when the engine speed drops to idle. The drop to idle occurs about 5 minutes after the regeneration cycle is initiated (i.e., about 13 minutes total time) and the peak outlet temperature increases in some locations of the outlet side of the diesel particulate filter to as high as 830° C. In this example, the teachings of the present invention are not implemented to control the outlet temperature of the filter because the regeneration cycle duration is over 5 minutes. Once the duration of the regeneration cycle lasts for 5 minutes or more the risk of damage to the diesel particulate filter is greatly reduced and the volume of flow through the filter is not controlled.

Example 6 as illustrated in FIG. 14 is one example where no control is performed when the engine drops to idle during a regeneration cycle. The length of the filter in this example is reduced from 7.2 inches to 6 inches. During normal engine operation the volume of flow through the diesel particulate filter is about 8 lbs/min, and during a drop to idle the volume is reduced to about 2 lbs/min. The inlet gas temperature to the diesel particulate filter during normal operating procedure is about 250° C. to about 275° C. As can be seen in FIG. 14 a regeneration cycle is triggered after about 2 minutes and the inlet gas temperature and the outlet gas temperature increase. After about 6 min and 20 seconds (i.e., about 8 minutes and 20 seconds total time) the engine speed drops to idle and the peak outlet temperature increases in some locations of the outlet side of the diesel particulate filter to as high as 1020° C. In comparing the results of FIG. 10 to FIG. 14 the peak outlet temperature in FIG. 13 is higher than the peak outlet temperature of FIG. 10. The increase in the peak outlet temperature is due to the decrease in the length of the diesel particulate filter. Thus, the shorter the filter used the greater the risk of damage at low flow rates when a drop to idle occurs during a regeneration cycle.

Figure 15:
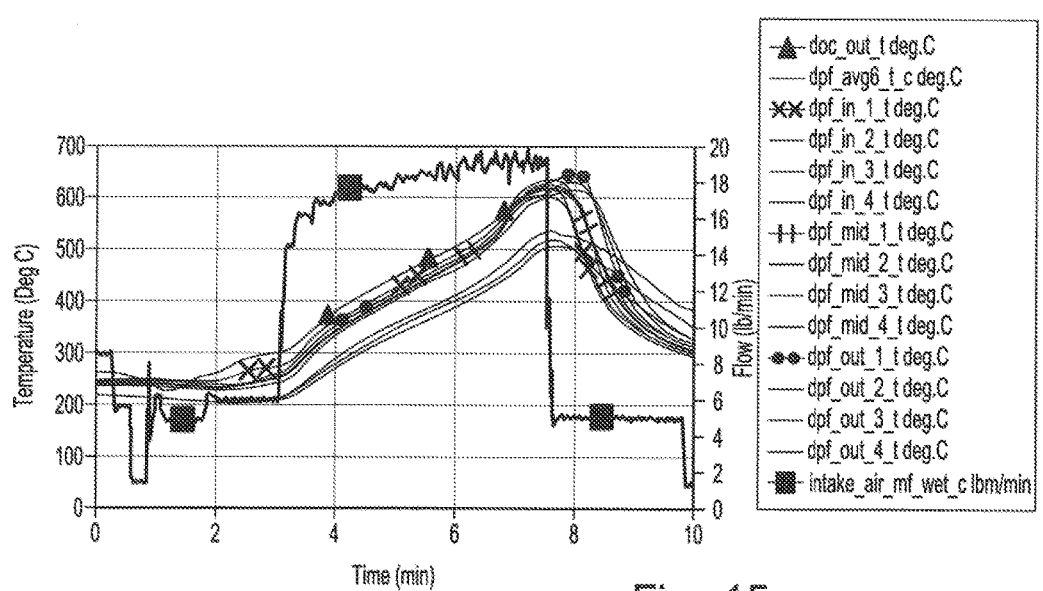
FIG. 15 illustrates the peak outlet temperature of a 6 inch filter when the mass flow rate is reduced from 19 lbs/min to 5 lbs/min during a drop to idle when the inlet gas temperature is 630° C.

Example 7 as illustrated in FIG. 15 is one example implementing the teachings of the present invention when the engine drops to idle during a regeneration cycle. During normal engine operation the volume of flow through the diesel particulate filter is about 19 lbs/min, and during a drop to idle the volume is reduced to about 5 lbs/min because the throttle valve was opened and the exhaust gas recirculation is closed, instead of the normal flow at idle of about 2 lbs/min. The inlet gas temperature to the diesel particulate filter during a normal operating procedure is about 225° C. to about 250° C. As can be seen in FIG. 15 a regeneration cycle is triggered after about 2 minutes and the inlet gas temperature and the outlet gas temperature increase. After about 4 min and 40 seconds (i.e., about 6 minutes and 40 seconds total time) the engine speed drops to idle, and the peak outlet temperature increases in some locations on the outlet side of the diesel particulate filter to as high as 620° C. Comparing FIG. 11 to FIG. 15 it can be seen that the peak outlet temperature of the shorter diesel particulate filter of FIG. 15 did not increase as much as the longer diesel particulate filter of FIG. 12. In comparing FIG. 14 to FIG. 15 it can be seen that by implementing the teachings of the present invention the outlet gas temperature is reduced by about 600° C., which is below a temperature where the diesel particulate filter may be damaged.

Figure 16:
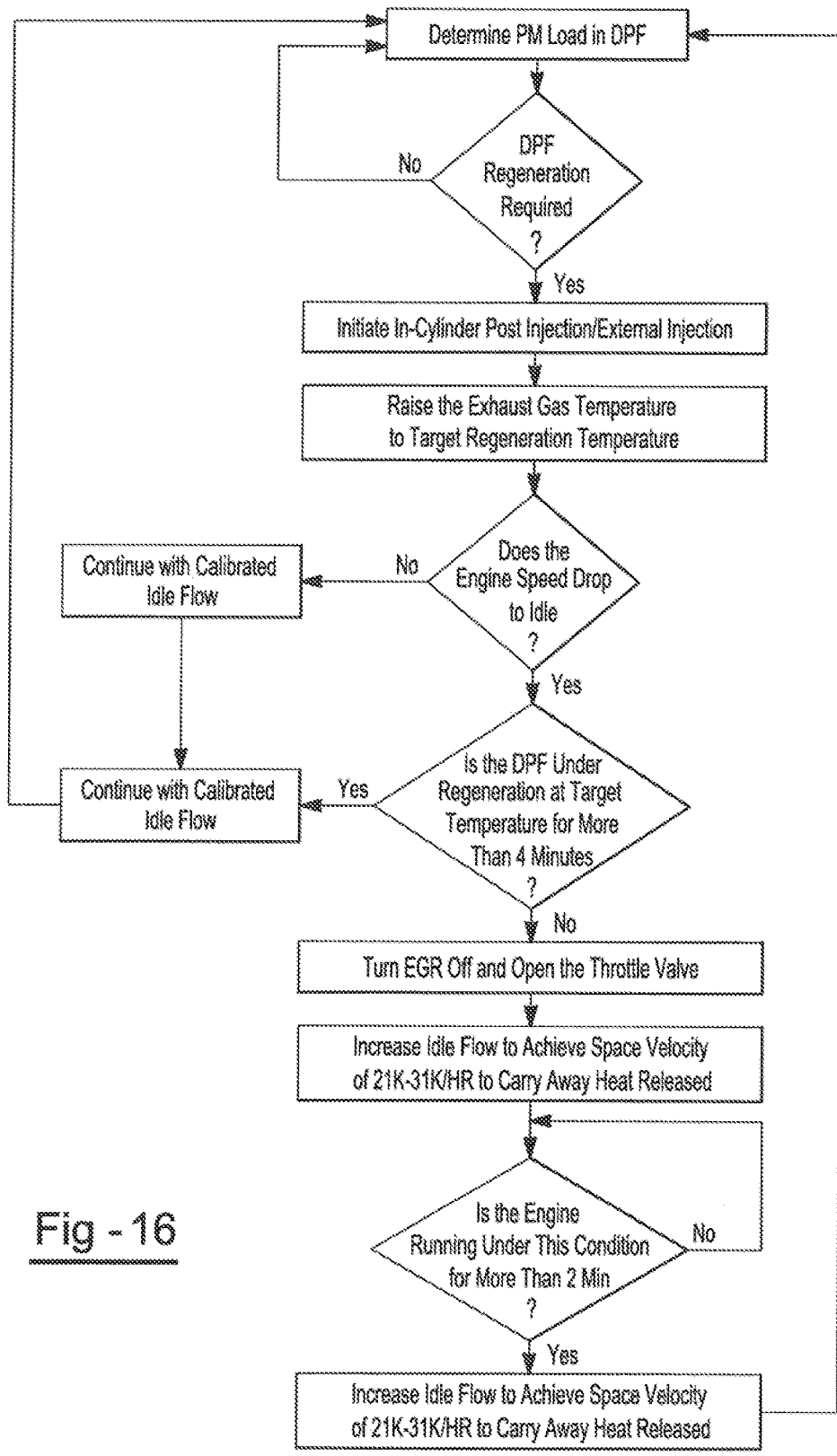
FIG. 16 illustrates a flow diagram that lists one possible combination of steps showing how the present invention may be performed.

FIG. 16 illustrates one example of a decision tree that the computer may use to control the peak outlet temperature. The decision tree begins by determining if the soot load in the diesel particulate filter is sufficient so that a regeneration cycle needs to be triggered. If the soot load has not achieved the target soot load then the computer will continue monitoring the soot loading of the diesel particulate filter. If the soot load in the diesel particulate filter has reached the target soot load then a regeneration cycle will be triggered. The computer will initiate the regeneration cycle by initiating an in-cylinder post injection or an external injection of fuel into the exhaust stream. The combustion of the fuel in the exhaust stream will increase the inlet gas temperature of the diesel particulate filter. The computer will monitor the inlet gas temperature so that the inlet gas temperature will not be raised above the target inlet gas temperature. Simultaneously, to beginning and controlling the regeneration cycle the computer will monitor the engine speed. If the engine does not drop to idle during the regeneration cycle the computer will maintain its standard settings during a regeneration cycle or continue with the calibrated flow as programmed into the computer. If the the engine drops to idle during the regeneration cycle the computer will consider the current duration of the regeneration cycle. If the regeneration has been at the target inlet gas temperature for more than 4 minutes the computer will not take any action and the computer will continue with the calibrated idle flows as were programmed into the computer. If the regeneration cycle has been in progress for 4 minutes or less the computer will diverge from the calibrated idle flow and implement a regeneration cycle idle flow. During a regeneration cycle idle flow the computer will contemporaneously close the exhaust gas recirculation (EGR) and maintain and/or open the throttle valve. The computer will continue to open the throttle valve and close the EGR until the space velocity reaches between about 21,000 to about 31,000 hrs. The computer will then measure the duration that the EGR has been reduced and the throttle valve has been increased. If the duration is 2 minutes or less than the computer will maintain the regeneration cycle idle flows until the duration is 2 minutes or greater. If the duration is greater than 2 minutes then the diesel particulate filter is no longer at risk for being damaged and the computer will revert to the calibrated idle flows Any numerical values recited herein include all values from the lower value to the upper value in increments of one unit provided that there is a separation of at least 2 units between any lower value and any higher value. As an example, if it is stated that the amount of a component or a value of a process variable such as, for example, temperature; pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A diesel particulate filter system comprising:
    a) a diesel particulate filter having a substantially linear soot load to pressure drop characteristic across the diesel particulate filter;
    b) a pressure sensor on the inlet side of the diesel particulate filter;
    c) a control module in communication with the pressure sensor, wherein the control module is loaded with one or more look-up tables; and
    d) at least one of the look-up tables is a pressure drop look-up table that takes into account the variation in soot load of the diesel particulate filter and correlates the amount of soot loaded in the diesel particulate filter to a change in pressure measured by the pressure sensor;
    wherein the control module initiates a regeneration cycle when soot loading of the diesel particulate filter achieves a predetermined soot load wherein the control module controls one or more process conditions, one or more process parameters, or both using the at least one the look-up table so that a length of the diesel particulate filter is reduced by 10 percent or greater, and the back pressure does not increase.

2. The diesel particulate filter system of claim 1, wherein the soot load in the diesel particulate filter is calculated by using the pressure drop look-up table and the pressure drop measured by the pressure sensor.

3. The diesel particulate filter system of claim 1, wherein the diesel particulate filter has a soot load variability of ±1.0 g/L at the predetermined soot load regardless of whether the diesel particulate filter is filled with soot after the soot is only partially or fully removed.

4. The diesel particulate filter system of claim 1, further including a temperature sensor on the inlet side of the diesel particulate filter and a temperature sensor on the outlet side of the diesel particulate filter that are in communication with the control module.

5. The diesel particulate filter system of claim 1, has an inlet gas temperature, wherein said inlet gas temperature of the diesel particulate filter is increased in only one stage, in the beginning of regeneration, to initiate a regeneration cycle.

6. The diesel particulate filter system of claim 1, wherein a target diesel particulate filter inlet gas temperature is accurately estimated by using a second look-up table that correlates a maximum diesel particulate filter bed temperature isotherm to a diesel particulate filter inlet gas temperature and soot load so that bed temperatures are maintained below a maximum temperature for a given diesel particulate filter so that the diesel particulate filter is not damaged.

7. The diesel particulate filter system of claim 1, wherein the temperature during the regeneration is controlled to the target temperature by accurately calculating the amount of soot load in the diesel particulate filter.

8. The diesel particulate filter system of claim 1, wherein one or more process conditions, one or more process parameters, or both are controlled using the look-up table so that regeneration efficiency is about 90 percent or greater.

9. The diesel particulate filter system of claim 1, wherein one or more process conditions, one or more process parameters, or both are controlled using the look-up table so that the regeneration cycle time is reduced by about 20 percent or greater, and the amount of fuel used during the regeneration cycle is reduced by about 20 percent or greater.

10. The diesel particulate filter system of claim 1, wherein the diesel particulate filter is made of Cordierite, Silicon Carbide, Aluminum Titinate, or mixtures thereof that include a discriminating layer or the diesel particulate filter is made of acicular mullite without a discriminating layer.

11. The diesel particulate filter system of claim 10, wherein the diesel particulate filter is acicular mullite without a discriminating layer.

* * * * *